(12) United States Patent
Kurniadi et al.

(10) Patent No.: US 12,205,101 B2
(45) Date of Patent: *Jan. 21, 2025

(54) SERVER DEVICE CONFIGURATIONS BASED ON MACHINE LEARNING

(71) Applicant: PayPal, Inc., San Jose, CA (US)

(72) Inventors: Fransisco Kurniadi, Dublin, CA (US); Yaqin Yang, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,985

(22) Filed: Oct. 9, 2023

(65) Prior Publication Data

US 2024/0152898 A1 May 9, 2024

Related U.S. Application Data

(63) Continuation of application No. 17/353,191, filed on Jun. 21, 2021, now Pat. No. 11,816,656, which is a continuation of application No. 16/601,025, filed on Oct. 14, 2019, now Pat. No. 11,042,867, which is a continuation of application No. 14/814,441, filed on Jul. 30, 2015, now Pat. No. 10,445,652.

(51) Int. Cl.
| | |
|---|---|
| *G06Q 20/34* | (2012.01) |
| *G06N 20/00* | (2019.01) |
| *G06Q 20/10* | (2012.01) |
| *G06Q 20/32* | (2012.01) |
| *H04L 67/50* | (2022.01) |
| *H04W 4/21* | (2018.01) |

(52) U.S. Cl.
CPC ........ *G06Q 20/325* (2013.01); *G06N 20/00* (2019.01); *G06Q 20/10* (2013.01); *H04L 67/535* (2022.05); *H04W 4/21* (2018.02)

(58) Field of Classification Search
CPC ...... G06Q 20/325; G06Q 20/10; G06N 20/00; H04L 67/535; H04W 4/21
USPC .......................................................... 705/34
See application file for complete search history.

(56) References Cited

U.S. PATENT DOCUMENTS

| | | |
|---|---|---|
| 10,262,362 B1 * | 4/2019 | Hu .......................... G06F 8/427 |
| 2006/0085330 A1 | 4/2006 | Imrey et al. |
| 2011/0178900 A1 | 7/2011 | Imrey et al. |
| 2011/0178901 A1 | 7/2011 | Imrey et al. |

(Continued)

*Primary Examiner* — Garcia Ade
(74) *Attorney, Agent, or Firm* — Haynes and Boone, LLP

(57) ABSTRACT

A system, a medium, and a method are provided to exchange data packets over a communications network and perform machine learning operations. A network server device receives account data from client devices that correspond to account profiles. An account engine of the network server device segments the account profiles into profile groups based on a respective balance associated with each account profile. The account engine determines target accounts from profile groups based on behavioral data. Further, data processing components of the network server device determine a method of contact for each target account. The data processing components determine a respective time to communicate with a respective device for each target account. Further, communication components of the network server (Continued)

device initiate communications to the respective devices at the respective times for each target account.

20 Claims, 11 Drawing Sheets

(56) References Cited

U.S. PATENT DOCUMENTS

2011/0178922 A1\* 7/2011 Imrey .................... G06Q 40/02
715/833

\* cited by examiner

SERVER DEVICE CONFIGURATIONS BASED ON MACHINE LEARNING

CROSS-REFERENCE TO RELATED APPLICATION

The present application is a continuation of U.S. patent application Ser. No. 17/353,191, filed Jun. 21, 2021, which is a continuation of U.S. patent application Ser. No. 16/601,025, filed Oct. 14, 2019, now U.S. Pat. No. 11,042,867, which is a continuation of U.S. patent application Ser. No. 14/814,441, filed Jul. 30, 2015, now U.S. Pat. No. 10,445,652, the disclosures of which are hereby incorporated by reference in their entirety.

TECHNICAL FIELD

This disclosure generally relates to electronic communications systems, and more particularly, systems configured to exchange data packets over a communications network.

BACKGROUND

Various types of electronic communication systems may include a server device that exchanges data packets with multiple other types of computing devices, possibly over a communications network. For example, the server device may exchange data packets with desktop computers, laptop computers, tablet computers, and/or smartphones. As these devices become increasingly more prevalent in the modern world, it is common for individuals to use such devices as part of their daily lives. For example, a user may make multiple purchases using a single mobile device, such as a smartphone. Further, a merchant may similarly sell numerous items or services using a tablet computer and/or a point-of-sale (POS) device. As such, the ability to seamlessly purchase and sell items or services may be convenient, possibly enabling users to buy items or services from merchants at virtually any location and at any time.

Yet, a number of issues may also arise. In some instances, buyers may purchase and/or make commitments to purchase items that they cannot afford. Further, merchants may commit to selling items that they do not have in stock and/or promise to sell items at prices that amount to losses. As such, various parties including users, merchants, buyers, and/or sellers are often found with accounts that have low balances, zero balances, and in many instances, negative or overdue balances. In various such circumstances, it may be difficult to urge such users to pay off their negative or overdue balances.

Further, it may be difficult to contact or reach such users to inform them regarding their accounts. Even after agents make thousands of attempts to contact such users, a small number of users actually can be reached. For example, users may not answer their calls and/or they may ignore their smartphones based on an identification (or lack of identification) of the party attempting to reach them or possibly based on not being able to identify or recognize the party attempting to reach them. Yet further, even a smaller number of users actually reached may result in the user paying off their negative or overdue balances.

In addition, it is also a concern that users with negative or overdue account balances may continue making commitments with other users, and possibly with other more responsible users with positive or up-to-date balances. For example, users with negative account balances may open new accounts and continue making obligations or commitments to the more responsible users to purchase items they cannot afford and/or promise to sell items that they do not have in stock, among other poor choices as described above.

Thus, there is much need for technological advancements to improve systems that attempt to communicate with users who have low, zero, negative, and/or overdue account balances and collect from those users. In particular, there is need for such improvements to help reach users, and contain or prevent them from creating new accounts and continuing to perform activities under new accounts.

Figure 1:
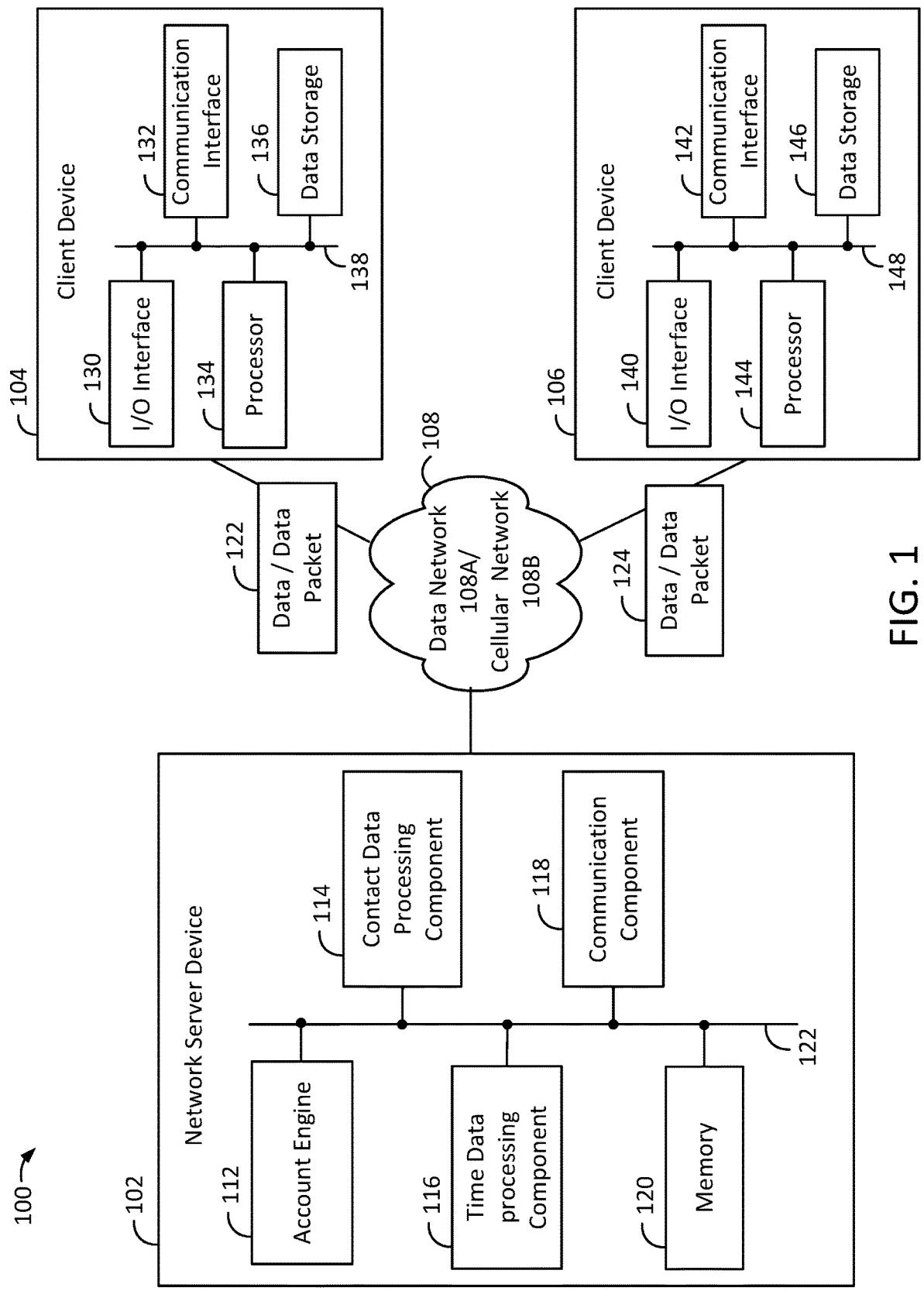
FIG. 1 is a block diagram of an exemplary system, according to an embodiment.

Embodiments of the present disclosure and their advantages may be understood by referring to the detailed description that follows. It should be appreciated that like reference numerals are used to identify elements illustrated in one or more of the figures, where the figures illustrate various examples for purposes of illustration and explanation related to the embodiments of the present disclosure and not for purposes of limitation.

DETAILED DESCRIPTION

Example embodiments herein describe the performance of machine learning operations to communication with and collection from users who have low, negative, and/or overdue account balances. In particular, the machine learning operations may be performed to help systems reach users, and possibly to further contain and/or prevent further activities, such as activating or creating new accounts and performing activities under the newly created accounts, for example. Notably, collecting payments from users with negative and/or overdue accounts may be important for service providers. Further, collecting such payments may also help to improve the experiences and/or perspectives of other, possibly more responsible users who may be interacting with the users who have the negative and/or overdue account balances. For example, the service provider may want to ensure that the more responsible users are satisfied interacting with other users who also have accounts maintained by the service provider.

In some embodiments, a system may include a network server device of a service or payment provider, such as PayPal, Inc. of San Jose, CA, USA, configured to perform machine learning operations. For example, the network server device may be configured to contact and/or reach users with negative and/or overdue accounts. In particular, the network server device may be configured to segment a number of accounts or account profiles into different account groups based on respective balances (e.g., negative and/or overdue balances) associated with each of the accounts. Further, the network server device may be configured to determine target accounts from the different account groups, where the target accounts may identify the users of the target accounts that should be pursued or contacted. Yet further, the network server devices may be configured to perform machine learning operations, such as determining various times to contact the users of the target accounts and ways to contact the users based on behavioral data retrieved. As such, the network server device may be used to initiate communications with the mobile devices of the targeted users to remind and/or urge the targeted users to partially or fully pay off their negative account balances.

In some embodiments, a system configured to exchange data packets and perform machine learning operations may include a network server device, such as those described above. The network server may be configured to receive account data from numerous client devices, where the client devices correspond to multiple account profiles of users. An account engine of the network server device may segment the number of account profiles into a number of profile groups. For example, the account engine may segment account profiles described, indicated, and/or labeled as "slacker," "unreliable," "unpredictable," "troubled," and/or "fraudster." The behavioral data for each target account may also indicate the number of late payments, missed payments, and/or rejected payments made under each target account, possibly by a targeted user.

The account engine may also determine a number of target accounts from the number of profile groups based on behavioral data retrieved by the network server device, where the behavioral data indicates various activities (e.g., purchases, sales, and/or transactions) of the target accounts. One or more data processing components of the network server device may determine a method of contact for each target account based on the behavioral data. Further, the one or more data processing components may determine a respective time to communicate with a respective device of each target account based on the methods of contact determined. Thus, one or more communication components of the network server device may initiate communications to the respective devices at the respective times for each target account, possibly to remind and/or urge the targeted users to partially or fully pay off their account balances.

In some embodiments, the behavioral data may also include location data indicative of locations of the respective device of each target account. For example, the location data may include global positioning system (GPS) data, beacon data, WI-FI signal strength data, base station data, triangulation data between the respective device and two or more other client devices, and/or sensor data retrieved by the number of client devices, where the sensor data further indicates the locations of the respective device. The sensor data may also include movement data (e.g., velocity and/or acceleration data), temperature data, altitude data, directional data, orientation data, and/or other types of data to determine the location of the respective device of each target account.

The behavioral data may also include payment data indicative of times of payments made or missed for at least one of the target accounts. The behavioral data may also include pattern data indicative of patterns of payments made or missed for at least one of the target accounts. The behavioral data may also include recurring payment data indicative of one or more recurring payments for at least one of the target accounts, such as automated or scheduled payment plans. Further, the behavioral data further may include peer data (e.g., data of other related or linked accounts) and/or social media data indicative of methods/ ways to contact peer accounts associated with the number of target accounts. For example, the social media data may include phone numbers and/or email addresses of peer accounts or friends associated with the target accounts. Thus, the one or more data processing components may determine the methods of contact, e.g., phone numbers and/or email addresses, for each target account based on the social media networks and related data including methods/ ways to contact peer accounts.

In some embodiments, the behavioral data associated with the target accounts indicates times associated with deposits submitted to the target accounts. For example, the behavior data may indicate the date, hour, and/or time or time frame when the targeted user (or another user on behalf of the targeted user) submits a deposit to their targeted account. As such, the one or more data processing components may determine the respective times to communicate with the respective devices for each target account, possibly based on the times associated with the deposits submitted. By communicating with the respective devices shortly after deposits are submitted to the corresponding target accounts, the probability of the targeted user paying off the targeted account balance may be increased.

In some embodiments, seller data may be used to determine when and how to contact a seller that has a low, zero, and/or negative balance. For example, consider a target account of a seller identified by the network server. The network server may determine that items are listed and sold under the target account, even where funds are not necessarily deposited into any account. For example, the activities or transactions may be completed in cash. As such, the network server may determine that the time to contact the targeted seller would be during or after the one or more activities, possibly where the targeted user receives cash. Further, the network server may determine the times to contact the targeted seller based on when the targeted seller may be expecting a busy selling period. For example, the targeted seller may be offering or selling "hot" or popular items. Further, the targeted seller may be selling items during traditional holidays (e.g., Christmas) and/or nontraditional (e.g., baseball opening day for a sports seller) in particular locations, as disclosed herein.

It should be noted that based on network server configurations, low and/or zero account balances may be identified in addition to the negative balances. In some instances, the identification of low and/or zero account balances may proactively enable the network server to determine or identify the target accounts with such balances. As such, the network server may proactively contact the users of such target accounts to prevent their accounts from becoming negative. In some instances, proactively informing such users may be effective in ensuring that users have positive balances in their respective accounts. For example, the network server may notify such users with possible alarms or messages such as, "Your Account Balance is Approaching Zero!" or "Your Account Balance is Low!"

In some embodiments, the one or more data processing components may determine a probability score for each target account based on a probability that the respective target account receives a payment, possibly to pay off the account balance. The one or more data processing components may also determine a method score for each target account based on the determined method of contact for each target account. For example, the method score may be higher or stronger for an identified phone number as opposed to an email address. The one or more data processing components may also determine a time score for each target account based on the respective times determined to communicate with the respective devices. For example, the time score may be higher or stronger based on additional times identified when a targeted user may be available or reached. The one or more communication components may also initiate the communications to the respective devices based on the probability score, the method score, the time score, and/or any combination of the scores.

In some embodiments, the one or more communication components may initiate the communications with at least one of an email communication, a text or short message service (SMS) communication, and/or a telephonic communication to the respective devices at the respective times, possibly based on the probability score, the method score, the time score, and/or a combination of the scores.

FIG. 1 is a block diagram of an example system 100, according to an embodiment. The system 100 may be configured to exchange data packets over a communications system and perform machine learning operations. As shown, the system 100 includes multiple computing devices, such as a network server device 102, a client device 104, and a client device 106, among other possible computing devices. The server device 102 may be configured to support, operate, and/or manage numerous accounts or user accounts. The system 100 may operate with more or less computing devices than those shown in FIG. 1, where each device may be configured to communicate over a communication network 108. As shown, the communication network 108 may include a data network 108A and a cellular network 108B. Thus, the server device 102, the client device 104, and/or the client device 106 may each be configured to communicate over the communication network 108.

The network server device 102 may be configured to perform various operations in accordance with this disclosure and the accompanying figures. In some embodiments, the network server device 102 may be configured to receive account data, e.g., data/data packets 122 and/or 124, from a number of client devices 104 and/or 106, where the client devices 104 and/or 106 correspond to a number of account profiles. The network server device 102 may segment the number of account profiles into a number of profile groups based on a respective balance associated with each account profile. The network server device 102 may also determine a number of target accounts from the number of profile groups based on behavioral data retrieved from the account data 122 and/or 124. The network server device 102 may determine a method of contact for each target account based on the behavioral data. The network server device 102 may also determine a respective time to communicate with a respective device 104 and/or 106 for each target account based at least on the methods of contact. The network server device 102 may also initiate communications to the respective devices 104 and/or 106 at the respective times for each target account.

For example, the network server device 102 may determine the respective time to communicate with a respective device 104 and/or 106 for each target account, where the respective device 104 and/or 106 may include or take the form a smartphone, a laptop, a tablet computer, a wearable computing device, a head-mountable display, a smart watch, and/or other devices associated with the target account, e.g., registered under the target account and/or owned or possessed by the targeted user. The account data, e.g., data packets 122 and/or 124, may be accessible via protocols such as Transmission Control Protocol/Internet Protocol (TCP/IP). In various embodiments, each of the data packets 122 and 124 may include 1,000 to 1,500 bytes, among other possible data ranges.

In some embodiments, the network server device 102 may take a variety of forms. The network server device 102 may take the form of a stand-alone and/or an enterprise-class server device, and/or a server device implementing one or more operating systems such as client- and/or server-based operating systems. Further, the network server device 102 may include multiple components, including, for example, an account engine 112, a contact data processing component 114, a time data processing component 116, a communication component and/or interface 118, and a memory component 120, any of which may be communicatively linked via a system bus, network, or other connection mechanism 122.

The account engine 112, the contact data processing component 114, and/or the time data processing component 116 may each take the form of a multi-purpose processor, a microprocessor, a special purpose processor, a digital signal processor (DSP), an application specific integrated circuit (ASIC), a programmable system on chip (PSOC), field-programmable gate array (FPGA), and/or other types of processing components. For example, the account engine 112 may take the form of a dedicated processing component configured to segment the account profiles into a number of profile groups based on a respective balance associated with each account profile. The account engine 112 may also determine a number of target accounts from the number of profile groups based on behavioral data retrieved from the account data 122 and/or 124. The data processing components 114 and/or 116 may each take the form of dedicated processing components configured to determine a method of contact for each target account based on the behavioral data and also determine a respective time to communicate with a respective device for each target account based on the methods of contact.

The communication component or interface 118 may take a variety of forms and may be configured to allow the network server device 102 to communicate with one or more devices, such as client device 104 and/or 106, according to a number of protocols. For example, the communication component 118 may include a transceiver that enables the network server device 102 to communicate with the client devices 104 and/or 106 via the communication network 108. Further, the communication component 118 may take the form of a wired interface, such as an Ethernet interface. Yet further, the communication component 118 may take the form of a wireless interface, such as a cellular or microcell interface, a WI-FI interface, another short-range, point-to-multipoint voice and/or data transfer communication interface, such as BLUETOOTH. In some instances, the communication component 118 may send/receive data or data packets to/from client devices 104 and/or 106.

The memory component 120 may include one or more of volatile, non-volatile, and/or replaceable storage components, such as magnetic, optical, or flash storage, and may be integrated in whole or in part with the account engine 112, and/or the data processing components 114 and/or 116. Further, the memory component 120 may include or take the form of a non-transitory computer-readable storage medium, having stored thereon computer-readable instructions (e.g., compiled or non-compiled program logic and/or machine code) that, when executed by the network server device 102, cause the network server device 102 to perform machine learning operations, such as those described in this disclosure and illustrated by the accompanying figures.

The client devices 104 and 106 may also be configured to perform a variety of operations such as those described in this disclosure and illustrated by the accompanying figures. In particular, client devices 104 and 106 may be configured to exchange data/data packets 122 and/or 124 with the network server device 102, that include account data, behavioral data possibly retrieved from the account data, location data, payment data, pattern data, recurring payment data, sensor data, peer data, social media data, GPS data, beacon data, WI-FI data, base station data, triangulation data, sensor data, movement data, temperature data, and/or other types of data described above.

Client devices 104 and 106 may take a variety of forms, including, for example, a personal computer (PC), a smartphone, a wearable computer, a laptop/tablet computer, a merchant device, a smart watch, a head-mountable display, other types of wearable devices, and/or other types of computing devices configured to transmit and/or receive data, among other possibilities. The client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured to receive inputs from (and provide outputs to) one or more users of the client devices 104 and 106. For example, the I/O interface 130 may enable a user to access their account via the client device 104. Thus, the I/O interfaces 130 and 140 may include input hardware such as a touchscreen, a touch sensitive panel, a microphone for receiving voice commands, a computer mouse, a keyboard, and/or other input hardware. In addition, I/O interfaces 130 and 140 may include output hardware such as displays with the touchscreens described above, a sound speaker, other audio output mechanism, a haptic feedback system, and/or other output hardware.

In some embodiments, communication interfaces 132 and 142 may take a variety of forms and may be configured to allow client devices 104 and 106, respectively, to communicate with one or more devices according to a number of protocols. For instance, communication interfaces 132 and 142 may be configured to allow client devices 104 and 106, respectively, to communicate with the network server device 102 via the communication network 108. The processors 134 and 144 may include multi-purpose processors and/or special purpose processors such as those described above. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon computer-readable instructions that, when executed by processors 134 and 144, cause client devices 104 and 106 to perform operations, respectively, such as those described in this disclosure and illustrated by the accompanying figures.

In some embodiments, the communication network 108 may exchange data among the network server device 102, the client device 104, the client device 106, and/or other computing devices as well. The communication network 108 may be a packet-switched network configured to provide digital networking communications and/or exchange data of various forms, content, type, and/or structure. The communication network 108 may include a data network 108A with various sizes of communication networks, such as a private and/or local area networks and/or wide area networks or the Internet. Further, the communication network 108 may include a cellular network 108B with one or more base station networks and/or cellular networks of various sizes, possibly accessible by various devices 102, 104, and/or 106. The communication network 108 may include network adapters, switches, routers, network nodes, base stations, microcells, and/or various buffers/queues to exchange data/data packets 122 and/or 124.

For example, the communication network 108 may be configured to carry the first data packet 122 and the second data packet 124 including account data, behavioral data possibly retrieved from the account data, location data, payment data, pattern data, recurring payment data, sensor data, peer data, social media data, GPS data, beacon data, WI-FI data, base station data, triangulation data, sensor data, movement data, temperature data, and/or other types of data described herein. The communication network 108 may exchange data packets 122 and/or 124 between the network server device 102, the client device 104, and/or the client device 106 using various protocols such as Transmission Control Protocol/Internet Protocol (TCP/IP), among other possibilities.

In some embodiments, the network server device 102 may be configured to receive account data, e.g., data/data packets 122 and/or 124, from a number of client devices 104 and/or 106, where the client devices 104 and/or 106 correspond to a number of account profiles. The account engine 112 may segment the number of account profiles into a number of profile groups based on a respective balance associated with each account profile. The account engine 112 may also determine a number of target accounts from the number of profile groups based on behavioral data retrieved from the account data 122 and/or 124. The data processing components 114 and/or 116 may determine a method of contact for each target account based on the behavioral data. The data processing components 114 and/or 116 may also determine a respective time to communicate with a respective device for each target account based on the methods of contact. As such, the communication component 118 may initiate communications to the respective devices, e.g., client devices 104 and/or 106, at the respective times for each target account.

It can be appreciated that the network server device 102 and the client devices 104 and 106 illustrated in FIG. 1 may be deployed in other ways. The operations performed and/or the services provided by such client devices 104 and 106 may be combined or separated for a given embodiment and may be performed by a greater number or fewer number of devices. Further, one or more devices may be operated and/or maintained by the same or different entities.

In some embodiments, an account, possibly also referred to simply as a user account, may be a compilation of data associated with a given user. As such, some examples of accounts may include accounts with service or payment providers such as PayPal, Inc. of San Jose, CA, USA and/or other types of financial, transactional, and/or e-commerce related accounts. Further, accounts may also include social networking accounts, e-mail accounts, smartphone accounts, music playlist accounts, video streaming accounts, among other possibilities. For example, an account for a particular user may include data related to the user, data related to the user's interest, and/or data representing the user. Further, the user may provide various types of data to a user device, e.g., client devices 104 and/or 106, with access to the account.

The user account may be displayed on a client device, possibly through I/O interfaces such as those described above in relation to FIG. 1. Thus, the user account may be displayed on a smartphone, a laptop computer, and/or a wearable computing device that may be used to access the account. The user may operate the client or computing device and their account may be managed on the computing device. For example, a computing device may be used to view and/or send one or more requests, user requests and/or related data, account data, purchase or transactional data, item or item description data, user device data, electronic messages and/or related data, requirement data, authentication data, biometric data, user data received in response to electronic messages, and/or other types of data described above.

In some embodiments, a user may have a single account such as an account with a service or payment provider representing the user for multiple other accounts described above such as e-mail accounts, social networking accounts, smartphone accounts, as well as websites, applications, and/or other services. For example, a user could opt to use their account as a multi-purpose account for performing various operations, including initiating user requests to purchase one or more items and authenticating or verifying the user requests.

In some embodiments, a user account may be created by one or more users. For example, one account may be a family account where a number of family members or users may have access to the family account. In some instances, the account may be a corporate account, where employees, staff, worker personnel, and/or contractors, among other individuals may have access to the corporate account. Yet further, it should be noted that a user, as described herein, may be a robot, a robotic system, a computing device, a computing system, and/or another form of technology capable of sending and receiving data corresponding to the account. A user may be required to provide a login, a password, a code, an encryption key, authentication data, biometric data, and/or other types of data to gain access to the account.

Figure 2A:
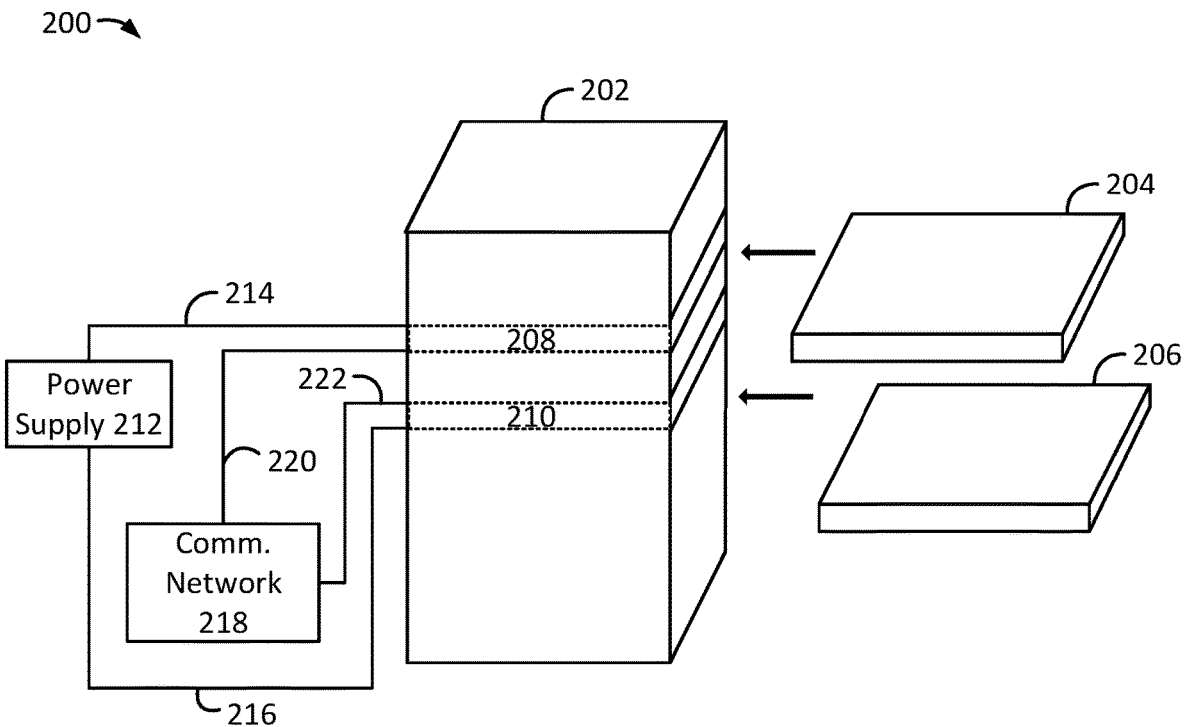
FIG. 2A illustrates an exemplary server device configured to support a set of trays, according to an embodiment.

FIG. 2A illustrates an exemplary network server device 200 configured to support a set of trays, according to an embodiment. The network server device 200 may, for example, take the form of the network server device 102 described above in relation to FIG. 1. Further, the network server device 200 may be configured to support, operate, run, and/or manage numerous user accounts or profiles, and various types of data including one or more requests, user requests and/or related data, user account data, purchase or transactional data, and/or other types of data described above.

As shown, network server device 200 may include a chassis 202 that may support trays 204 and 206, and possibly multiple other trays as well. The chassis 202 may include slots 208 and 210, among other possible slots, configured to hold trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of server device 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the network server device 200 may continue operating without interruptions.

The chassis 202 may be connected to a power supply 212 via connections 214 and 216 to supply power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1, possibly including one or both of the data network 108A and the cellular network 108B. In some embodiments, the communication network 218 may provide a network port, a network hub, a network switch, or a network router that may be connected to an Ethernet link, an optical communication link, a telephone link, among other possibilities.

Figure 2B:
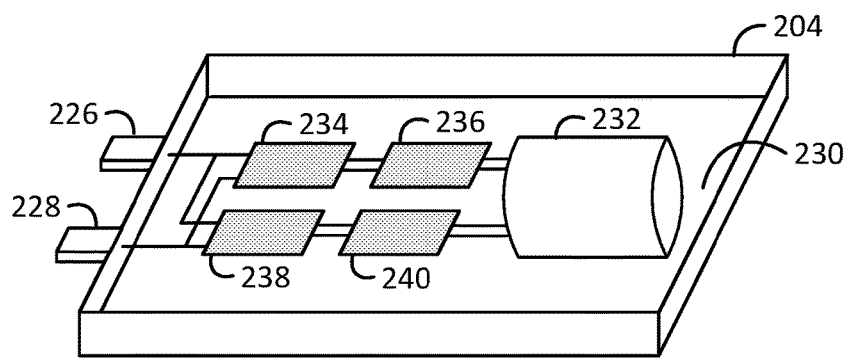
FIG. 2B illustrates an exemplary tray configured to support one or more components, according to an embodiment.

FIG. 2B illustrates an exemplary tray 204 configured to support one or more components, according to an embodiment. The tray 204 may, for example, take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 230-238. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

The tray 204 may include components 232-240. In particular, the tray 204 may include the account engine 232, the contact data processing component 234, the time data processing component 236, the communication component and/or interface 118, and the memory component 240 that may, for example, take the form of the account engine 112, the contact data processing component 114, the time data processing component 116, the communication component and/or interface 118, and the memory component 120. As such, the connections 226 and 228 may be configured to provide power and network connectivity, respectively, to each of the components 232-240. In some embodiments, one or more of the components 232-240 may be configured or supported via one or more circuits that include resistors, inductors, capacitors, voltage sources, current sources, switches, logic gates, registers, and/or a variety of other circuit components to perform operations described herein and illustrated by the accompanying figures. In some embodiments, the network server device 200 may execute instructions on a non-transitory, computer-readable medium to configure or support one or more of the components 232-240 to perform such operations.

As shown, the account engine 232, possibly also referred to as an account management engine, may include numerous databases for storing, processing, and/or securing user account data in the network server device 200. For example, the account management engine may include relational databases, possibly to perform account data processing and/or online analytical processing of user account data. The account management engine may generate numerous search queries, search multiple databases in parallel, and produce search results simultaneously and/or consecutively. As such, the account engine 232 may create multiple tables, database objects, indices, and/or views to perform account management and/or analytical processing of numerous accounts and/or account profiles.

Any two or more of the components 232-240 described above may be combined to take the form of one or more multi-purpose processors, microprocessors, and/or special purpose processors, among other types of processors. For example, two or more of the account engine 232, the contact data processing component 234, the time data processing component 236, the communication component and/or interface 118, and the memory component 240 may be combined. Further, the combined device may take the form of one or more network processors, DSPs, PSOCs, FPGAs, and/or ASICs, among other types of processing devices and/or components. As such, the combined device may be configured to carry out various operations of the components 232-240.

It should be noted that components 232-240 described above may provide benefits, improvements, and/or advantages over conventional or general-purpose servers and/or computers. For example, components 232-240 may segment account profiles, determine target accounts, and/or determine methods of contacts and/or respective times to communicate with respective devices more efficiently through the machine learning configurations of components 232-240 as described herein. For example, configuring separate and dedicated processing components 114 and/or 116 for determining methods of contact and respective times to communicate with respective device may optimize performance beyond the capabilities of conventional servers and/or general-purpose computers.

In some embodiments, the network server device 200 may be configured to receive account data, e.g., data/data packets 122 and/or 124, from a number of client devices 104 and/or 106, where the client devices 104 and/or 106 correspond to a number of account profiles. The account engine 232 may segment the number of account profiles into a number of profile groups based on a respective balance associated with each account profile. The account engine 232 may also determine a number of target accounts from the number of profile groups based on behavioral data retrieved from the account data 122 and/or 124. The data processing components 234 and/or 236 may determine a method of contact for each target account based on the behavioral data. The data processing components 234 and/or 236 may also determine a respective time to communicate with a respective device, e.g., client devices 104 and/or 106, for each target account based on the methods of contact. As such, the communication component 118 may initiate communications to the respective devices, e.g., client devices 104 and/or 106, at the respective times for each target account.

It can be appreciated that the network server device 200, the chassis 202, the trays 204 and 206, the slots 208 and 210, the power supply 212, the communication network 218, and the components 232-240 may be deployed in other ways. The operations performed by components 232-240 may be combined or separated for a given embodiment and may be performed by a greater number or fewer number of components or devices. Further, one or more components or devices may be operated and/or maintained by the same or different entities.

Figure 3A:
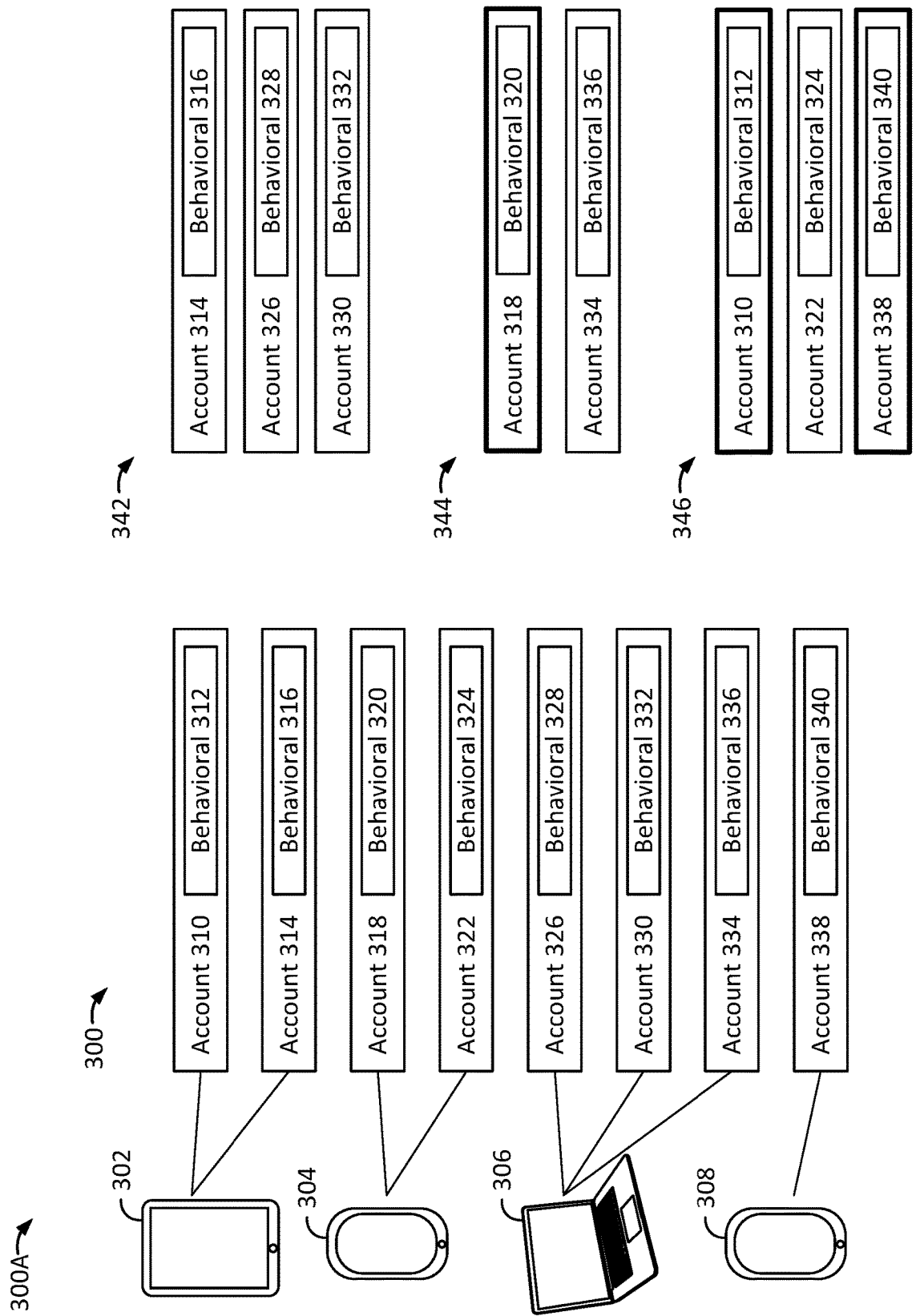
FIG. 3A illustrates an exemplary system with a number of client devices, according to an embodiment.

FIG. 3A illustrates an example system 300A and a number of client devices, according to an embodiment. As shown, the client device 302 may take the form of a tablet device or a point-of-sale (POS) device configured to access merchant accounts or account profiles 310 and 314 with a service provider, such as those described above. The client device 304 may take the form of a (first) smartphone configured to access accounts or account profiles 318 and 322 with the service provider. The client device 306 may take the form of a laptop computer configured to access seller accounts or account profiles 326, 330, and 334 with the service provider. The client device 308 may take the form of a (second) smartphone 308 configured to access user account or account profile 338 with the service provider. Notably, each of the client devices 302-308 may have access to more than one account. Further, each of client devices 302-308 may receive usernames and passwords to enable access to respective accounts 310, 314, 318, 322, 326, 330, 334, and/or 338.

In some embodiments, the system 300A may take the form of the one or more systems described above to exchange data or data packets 300 over a communications network and to perform machine learning operations. The system 300A may include a network server device (e.g., the network server device 102 and/or 200) that receives account data or data packets 300, from the number of client devices 302-308, where the number of client devices 302-308 corresponds to a number of account profiles 310, 314, 318, 322, 326, 330, 334, and/or 338. It should be noted that the account profiles may be referred to and/or represented as data packets 310, 314, 318, 322, 326, 330, 334, and/or 338. For example, these data packets may take the form of data packets 122 and/or 124.

An account engine of the network server device such as those described above may segment the number of account profiles 310, 314, 318, 322, 326, 330, 334, and/or 338 into a number of profile groups 342, 344, and/o 346 based on a respective balance associated with each account profile. For example, the account engine may segment account profiles 314, 326, and/or 330 into profile group 342 based on low balances associated with each of the account profiles 314, 326, and/or 330. The account engine may segment account profiles 318 and/or 334 into profile group 344 based on zero or near zero balances associated with each of the account profiles 318 and/or 334. The account engine may segment account profiles 310, 322, and/or 338 into profile group 346 based on negative balances associated with each of the account profiles 310, 322, and/or 338. It should be noted that the account engine may segment the account profiles 310, 314, 318, 322, 326, 330, 334, and/or 338 in various ways based on the account profiles, the account data, and/or other machine learning configurations of the network server device.

The account engine may determine a number of target accounts 310, 318, and/or 338 from the number of profile groups 344 and 346 based on behavioral data 312, 320, and/or 340 retrieved from the account data 300. The one or more data processing components of the network server device determines a method of contact for each target account 310, 318, and/or 338 based on the behavioral data 312, 320, and/or 340, respectively. The one or more data processing components of the network server device further determines a respective time to communicate with a respective device, e.g., client devices 302, 304, and 308, for each target account 310, 318, and/or 338, respectively, based on the methods of contact. In addition, the one or more communication components of the network server device may initiate communications to the respective devices, e.g., client devices 302, 304, and 308, at the respective times for each target account 310, 318, and/or 338, respectively. It should be noted that the one or more data processing components may be configured to perform machine learning operations to increase the probability of reaching targeted users with the communications initiated.

Figure 3B:
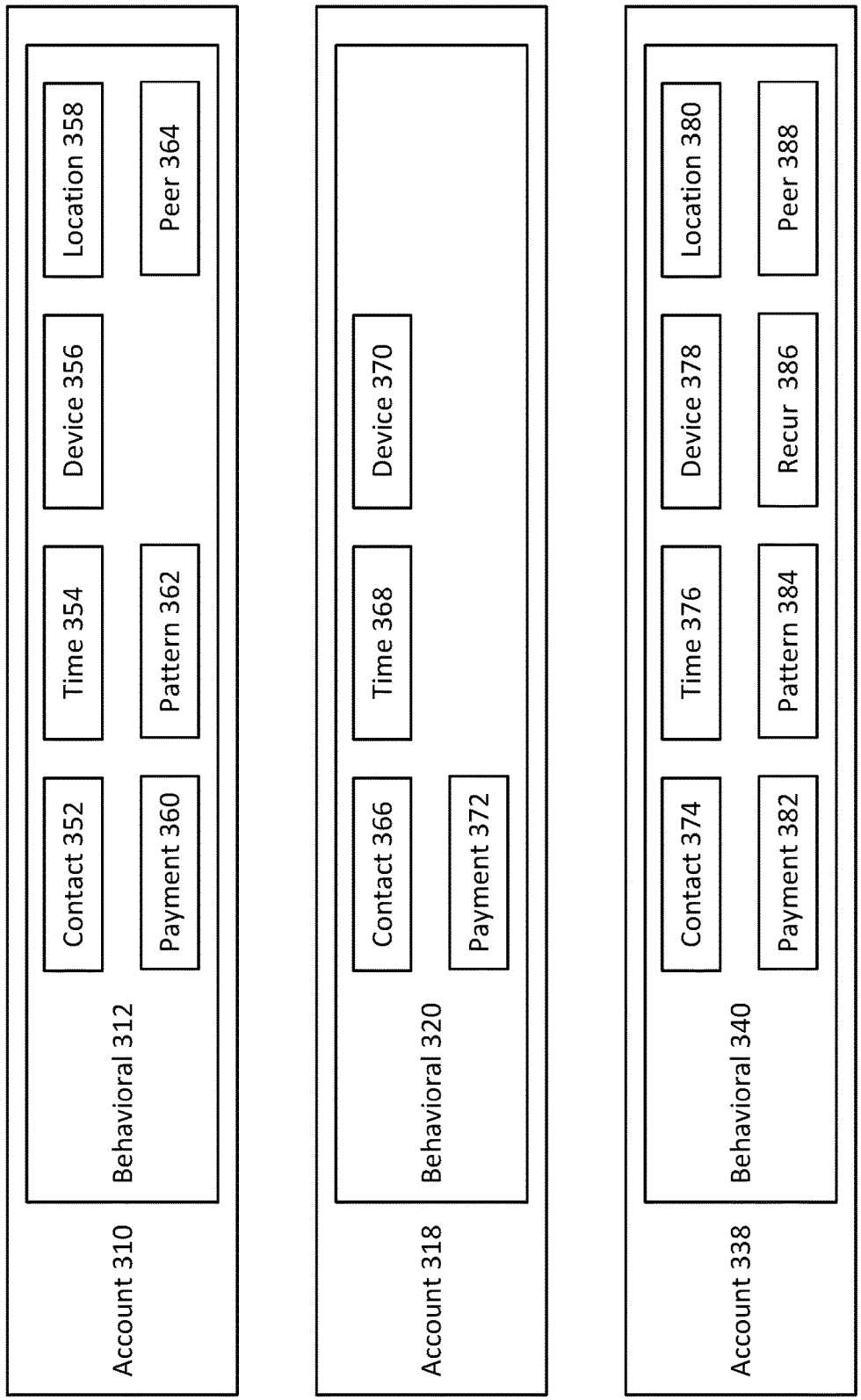
FIG. 3B illustrates data packets and a number of target accounts, according to an embodiment.

FIG. 3B illustrates data packets 300B and a number of target accounts 310, 318 and/or 338, according to an embodiment. It should be noted that these target accounts 310, 318, and/or 338 may take the form of data packets to be referred to as data packets 310, 318, and/or 338, respectfully. As shown, target accounts 310, 318, and/or 338 may include behavioral data 312, 320, and/or 340, respectively. Behavioral data 312 may include contact data 352, time data 354, device data 356, location data 358, payment data 360, pattern data 362, and/or peer data 364. Behavioral data 320 may include contact data 366, time data 368, device data 370, and/or payment data 372. Behavioral data 340 may include contact data 374, time data 376, device data 378, location data 380, payment data 382, pattern data 384, recurring payment data 386, and/or peer data 388.

The contact data 352, 366, and/or 374 may include phone number data, email address data, electronic messaging data, mailing address data, fax number data, application programming interface (API) data, and/or other forms of data related to contacting or communicating with the client device 302, 304, and/or 308. The time data 354, 368, and/or 376 may include calendar data from one or more digital calendars, schedule data including event or status data, alarm data indicative of one or more particular times the alarms are set to go off or sound, and/or other forms of data possibly stored in the respective client devices 302, 304, and/or 308, and related to time. For example, the network server devices may process alarm data to perform machine learning and thereby send notifications to targeted users after alarms are set off on the client devices 302, 304, and/or 308. As such, the targeted users may be contacted just after waking up and turning off alarms on the respective client devices 302, 304, and/or 308.

The device data 356, 370, and/or 378 may include data indicative of an operating mode of the client device 302, 304, and/or 308 (e.g., whether the device is on, off, in standby mode, sleep mode, or a busy mode). The device data 356, 370, and/or 378 may also include protocol data processed by the server data such as cellular protocol data, including GSM, CDMA, UMTS, EV-DO, WiMAX, or LTE data, radio-frequency identifier (RFID) data, such as near-field communications (NFC) data, among other possibilities. The device data 356, 370, and/or 378 may be processed to determine when targeted users may be unavailable. For example, the network server devices may process the operating mode data to determine when the client devices 302, 304, and/or 308 may be in standby mode, sleep mode, and/or busy mode. As such, the network server devices may avoid attempting communications with the client devices 302, 304, and/or 308 at such times.

Location data 358 and/or 380 may include geo location data, WiFi beaconing data, SSID reading data, Bluetooth data, and/or other near-field communication data. Further, location data 358 and/or 380 may include Enhanced Observed Time Difference (EOTD) data, Assisted GPS (A-GPS) data, Differential GPS (DGPS) data, Time Difference of Arrival (TDOA) data, Angle of Arrival data, triangulation data, local transceiver pilot signal data, among other forms of location data described above. Location data 358 and/or 380 may also be processed to determine when to attempt communications with client devices 302, 304, and/or 308. For example, in instances where location data 358 and/or 380 indicate work locations of the targeted users, the network server devices may avoid attempting communications with the client devices 302 and/or 308 at such times. For instance, the network server devices may delay or time the communications to times when the client devices 302 and/or 308 have left the work locations to better approximate reaching the targeted users. It should be noted that client device 304 may have its location setting turned off such that the network server device may not be able to retrieve location data indicating the location of the client device 304. As such, the network server may rely on other types of data 366, 368 370, and/or 372 to initiate communications to the client device 304.

Payment data 360, 372, and/or 382 may include balance data, available balance data, present balance data, total balance data, activity data, statement data, and/or transfer data, among other forms of payment or transactional data related to the target accounts 310, 318, and/or 338. The pattern data 362 and/or 384 may include data regarding when transactions were completed, attempted, and/or denied, among other forms of data indicative when payments occur for the target accounts 310 and/or 338. The recurring payment data 386 may include data associated with automated payment data, payment plan data, payment date data, and/or other forms of data indicative of scheduled payments. Peer data 364 and/or 388 may include data regarding other accounts or target accounts such as account 314, 322, 326, 330, and/or 334.

In some embodiments, each of target accounts 310, 318 and/or 338 indicates a low balance, a zero balance, a negative balance, and/or an overdue balance. For example, target account 318 may have a low account balance and target accounts 310 and/or 338 may have negative account balances. Further, the behavioral data 312, 320, and/or 340 for each of target accounts 310, 318 and/or 338 may indicate a number of late payments, missed payments, and/or rejected payments made for each target account. For example, behavioral data 312 may include payment data 360 that indicates a number of late payment made for the target account 310. The behavioral data 320 may include payment data 372 that indicates a number of missed payments and/or rejected payments made under the target account 318. Behavioral data 340 may include payment data 382 that indicates a number of late payments, missed payments, and/or rejected payments made for the target account 338.

In some embodiments, the behavioral data 312 and/or 340 may include location data 358 and/or 380, respectively, indicative of locations of the respective devices 302 and/or 308. The location data 358 and/or 380 may include GPS data, beacon data, WI-FI data, base station data, triangulation data, sensor data, movement data (e.g., acceleration and/or velocity data), temperature data, and/or other types of data described above. In some instances, the location data 358 and/or 380 may include sensor data retrieved by the number of client devices 302-308 collectively, where the sensor data may indicates the locations of the respective devices 302, 304, and/or 308 identified from the number of client devices 302-308.

In some embodiments, the behavioral data 312, 320, and/or 340 may include payment data 360, 372, and/or 382, respectively indicative of times of payments made or missed for at least one of the target accounts 310, 318, and/or 338. Further, the behavioral data 312 and/or 340 may include pattern data 362 and/or 384 indicative of patterns of payments made or missed for at least one of the target accounts 310 and/or 338. Further, the behavioral data 340 may include recurring payment data 386 indicative of one or more recurring payments or automated payments for at least one of the target accounts 338.

In some embodiments, the behavioral data 312 and/or 340 further include peer data 364 and/or 388, respectively, and/or social media data included in the peer data 364 and/or 388 that may be indicative of methods to contact peer accounts associated with the number of target accounts 310, 318, and/or 388. The one or more data processing components may determine the method of contact for each target account 310, 318, and/or 338 based on the methods to contact peer accounts, such as accounts 314, 322, 326, 330, and/or 334. For example, peer data 364 may be indicative of methods, e.g., cell phone or email, to contact a peer account 326 associated with the target account 310. In particular, the peer account 326 and the target account 310 may have interacted for making or receiving payments and/or transactions, among other types of account activities. As such, the one or more data processing components may determine the method of contact for target account 310 to be via cell phone or email.

In some embodiments, the behavioral data 312, 320, and/or 340 associated with the number of target accounts 310, 318, and/or 338 indicates times associated with deposits submitted to each of the target accounts 310, 318, and/or 338. As such, the one or more data processing components may determine the respective times to communicate with the respective devices 302, 304, and/or 308 for each the target account 310, 318, and/or 338, respectively, based on the times associated with the deposits submitted. By communicating with the respective devices 302, 304, and/or 308 shortly after deposits are submitted to the corresponding target accounts 310, 318, and/or 338, the probability of the targeted account balance being paid off may be increased.

Figure 3C:
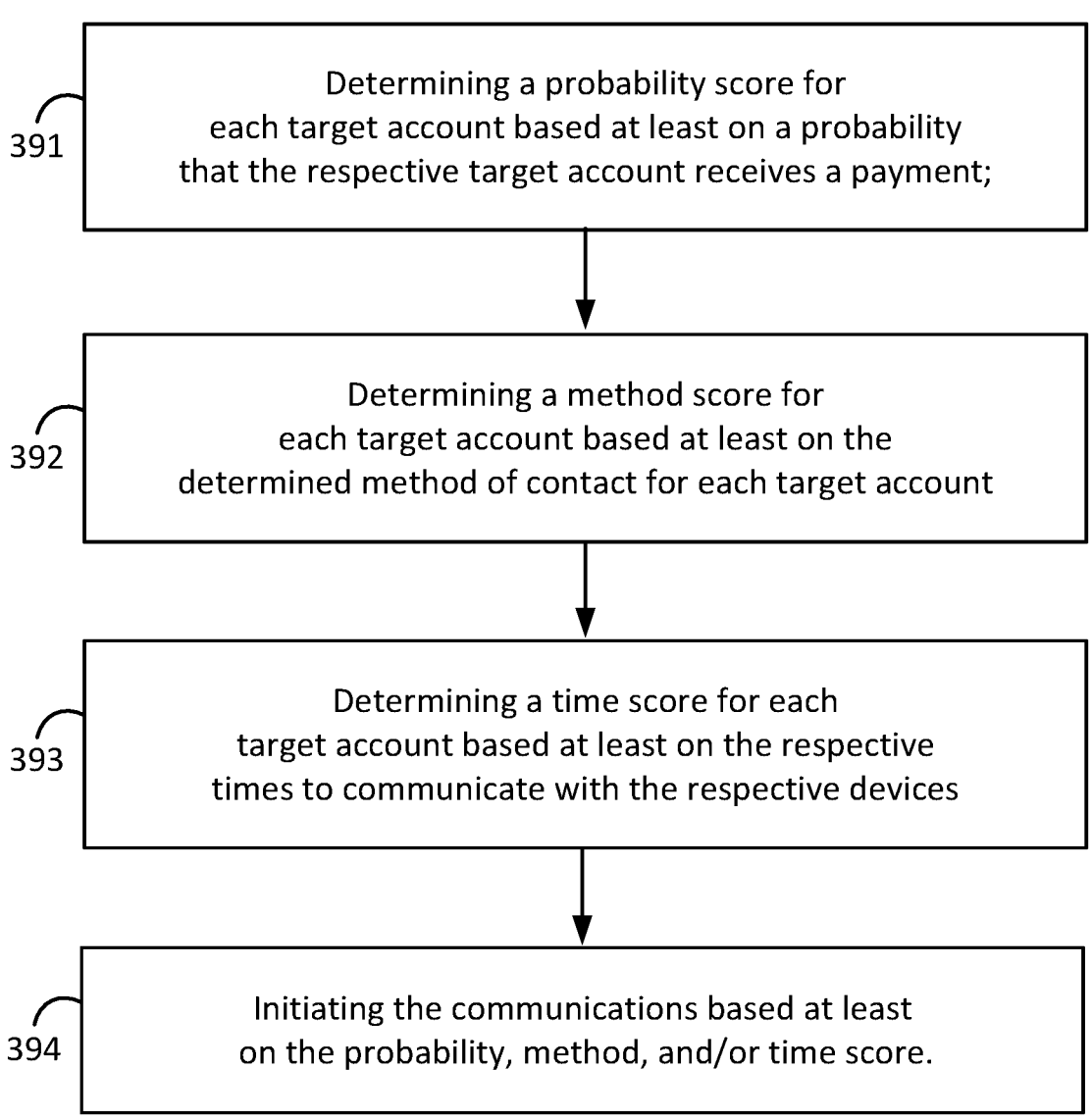
FIG. 3C is a flowchart of an exemplary method, according to an embodiment.

FIG. 3C is a flowchart of an exemplary method 390, according to an embodiment. Notably, one or more steps of the method 390 or other methods/processes described herein may be omitted, performed in a different sequence, and/or combined for various types of applications. At step 391, the method 390 may include determining a probability score for each of the target accounts 310, 318, and/or 338 based on a probability that the respective target account receives a payment. For example, the probability score may be a score from 1 to 999 based on the probability that the respective target account receives a payment to pay off a negative balance of the target account, where 0 is the lowest probability and 999 is the highest probability. For instance, a probability score of 300 or 400 may be determined for the target account 310 based payment data 360 indicating payments historically received to pay off negative balances of the target account previously incurred. In another example, the probability score may be a score from 1 to 5 based on the probability that the respective target account receives a payment to pay off a negative balance of the target account, where 0 is the lowest probability and 5 is the highest probability.

At step 392, the method 390 may include determining a method score for each of the target accounts 310, 318, and/or 338 based on the determined method of contact for each of the target accounts 310, 318, and/or 338. For example, the method score may be a score from 1 to 5 based on the determined method of contact including, where 0 is the lowest method score and 5 is the highest method score. For instance, a method score of 3 or 4 may be determined for the target account 310 based on a cell phone number identified of client device 302. Yet, a method score of 1 or 2 may be determined based on an email address identified associated with the target account 310. In particular, the method score may be higher or increased based on a higher probability of contacting the targeted user using the method of contact determined.

At step 393, the method 390 may include determining a time score for each of the target accounts 310, 318, and/or 338 based on the respective times determined to communicate with the respective devices 302, 304, and/or 308. For example, the time score may be a score from 1 to 5 based on the determined time to communicate with the respective devices 302, 304, and/or 308, where 0 is the lowest time score and 5 is the highest time score. For instance, a method score of 4 may be determined for the target account 310 based on five to six different time periods determined to communicate with the client device 302 to reach the targeted user, possibly with a determined probability of reaching the targeted user. As such, the time score may be higher based on the number of times determined to communicate with the client device 302.

At step 394, the method 390 may include initiating the communications based on the probability score, the method score, and/or the time score. For example, the probability score, the method score, and/or the time score may be combined, averaged, and/or summed to determine an overall score. For instance, the overall score for target account 310 may be higher than that of target accounts 318 and/or 338. As such, the communications to client device 302 may be prioritized over the communications to client devices 304 and/or 308. It should be noted that the more data retrieved by the network server device associated with the target account 310 may lead to the overall score of the target account 310 being higher than the target account 318. Yet, in some instances, the network server device may determine a higher probability score for the target account 310 than that of the target account 338.

In some embodiments, the one or more communication components may initiate the communications with at least one of an email communication, a text or SMS communication, and/or a telephonic communication to the respective devices 302, 304, and/or 308 at the respective times based on the probability score, the method score, the time score, and/or the overall score as described above.

In some embodiments, a non-transitory computer-readable medium may have stored thereon instructions. The instructions, when executed by a server device (e.g., the network server devices 102 and/or 200) cause the server device to perform operations, such as the machine learning operations described herein. The operations may include accessing, by the server device, account data 300 from a number of user devices 304 and/or 308, and merchant devices 302 and/or 306 that correspond to a number of accounts 310, 314, 318, 322, 326, 330, 334, and/or 338. The operations may also include accessing, by an account engine of the server device, a profile for each account of the number of accounts 310, 314, 318, 322, 326, 330, 334, and/or 338, based on a respective number of delinquent actions associated with each account 310, 314, 318, 322, 326, 330, 334, and/or 338. For example, the respective number of delinquent actions associated with each account 310, 314, 318, 322, 326, 330, 334, and/or 338 may indicate a number of missed payments associated with each account, a number late payments associated with each account, and/or a number of rejected payments associated with each account, among other types of account activities. For example, other types of activities may include transfer of invalid instruments, goods, and/or services, where the targeted user owes another user funds or property.

In some instances, the operations may include determining a profile for each account of the number of accounts 310, 314, 318, 322, 326, 330, 334, and/or 338, where each of the profiles may be different, similar, or the same. For example, the profiles for accounts 314, 326, and/or 330 in group 342 may be the same profile, such as a "missed payments" profile. The profiles for accounts 318 and/or 334 in group 344 may be the same profile, such as a "late payments" profile. The profiles for accounts 310, 322, and/or 338 in group 346 may be the same profile, such as a "rejected payments" profile.

The operations may also include determining, by the account engine described herein, a number of target accounts 310, 318, and/or 338 from the number of accounts 310, 314, 318, 322, 326, 330, 334, and/or 338 based on the profiles of each of the accounts 310, 314, 318, 322, 326, 330, 334, and/or 338. In some embodiments, determining the number of target accounts 310, 318, and/or 338 is further based on respective balances of each account of the number of accounts 310, 314, 318, 322, 326, 330, 334, and/or 338.

The operations may also include determining, by a data processing component of the server device described herein, a method of contact for each of the target accounts 310, 318, and/or 338 based on behavioral data 312, 320, and/or 340 retrieved from the account data 300. The operations may also include determining, by the data processing component, a respective time to communicate with the respective devices 302, 304, and/or 308 for each of the target accounts 310, 318, and/or 338 based on the methods of contact. The operations may also include initiating, by a communication component of the server device, communications to the respective devices 302, 304, and/or 308 at the respective times for each of the target accounts 310, 318, and/or 338.

In some embodiments, referring back to FIG. 3B, the behavioral data 312 and/or 340 further includes peer data 364 and/or 388, respectively, and/or social media data in the peer data 364 and/or 388 that may be indicative of methods to contact peer accounts associated with the number of target accounts 310, 318, and/or 338. Further, the operations may include determining the method of contact for each of the target accounts 310, 318, and/or 338 based on the methods to contact peer accounts. For example, peer data 364 may be indicative of a method to contact, e.g., via cell phone or email, a peer account 326 associated with the target account 310. As such, the one or more data processing components may determine the method of contact for target account 310 to be via cell phone or email.

In some embodiments, the behavioral data 312, 320, and/or 340 associated with the number of target accounts 310, 318, and/or 338 may indicate times associated with deposits submitted to each of the target accounts 310, 318, and/or 338. Further, determining the respective times to communicate with the respective devices 302, 304, and/or 308 for each of the target accounts 310, 318, and/or 338 may be based on the times associated with the deposits submitted. As noted, by communicating with the respective devices 302, 304, and/or 308 shortly after deposits are submitted to the corresponding target accounts 310, 318, and/or 338, the probability of the balances of the targeted accounts 310, 318, and/or 338 being paid off partially or fully may be increased.

Figure 3D:
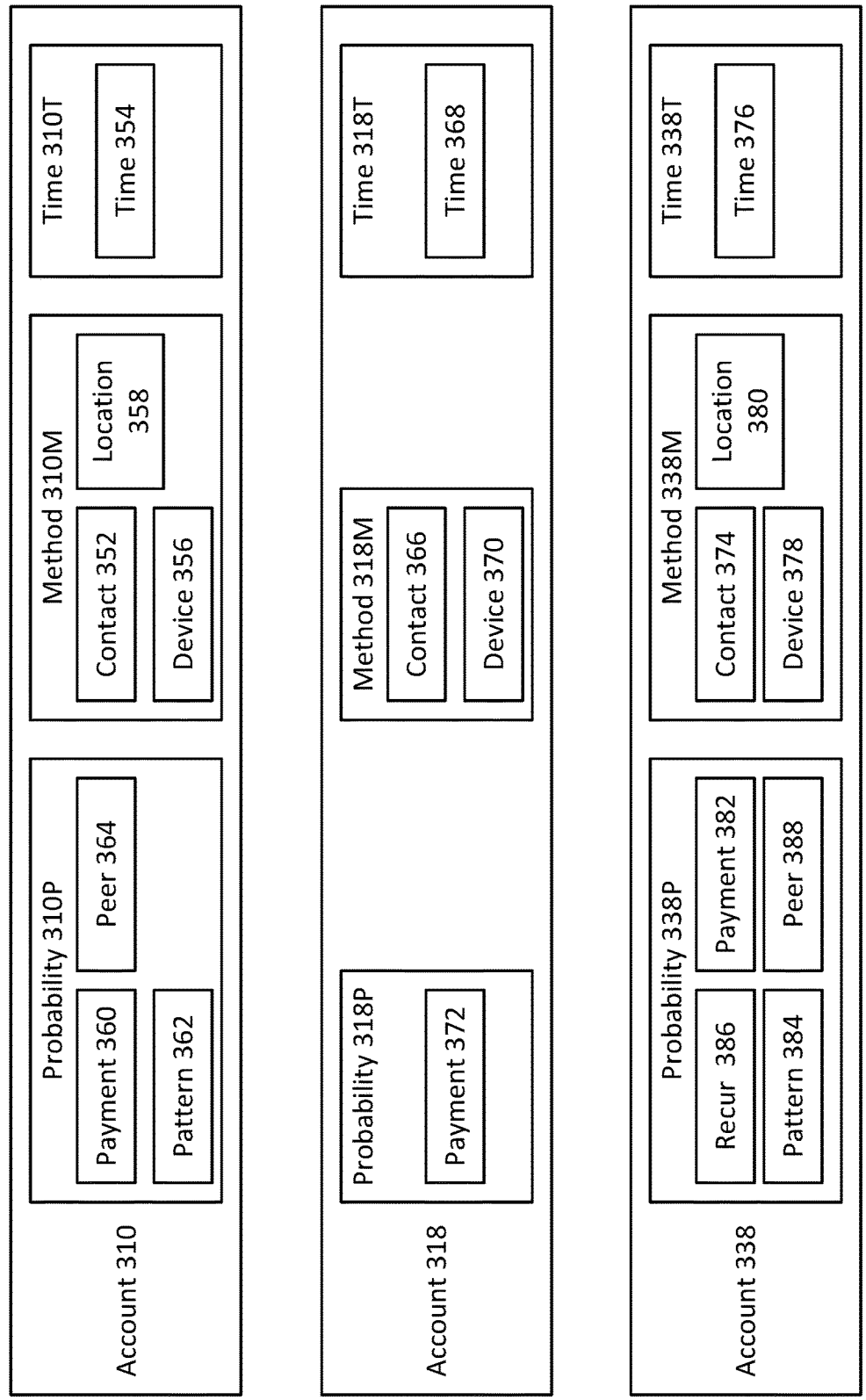
FIG. 3D illustrates data packets and score data of a number of target accounts, according to an embodiment.

FIG. 3D illustrates data packets 300D and score data of a number of the target accounts 310, 318 and/or 338, according to an embodiment. It should be noted that these target accounts 310, 318, and/or 338 may take the form of data packets to be referred to as data packets 310, 318, and/or 338, respectfully. As shown, target account 310 may include probability score data 310P, method score data 310M, and time score data 310T. It should be noted that the data 310P, 310M, and/or 310T may take the form of data packets to be referred to as data packets 310P, 310M, and/or 310T, respectfully. The probability score data 310P may be representative of the payment data 360, pattern data 362, and/or peer data 364. For example, probability score data 310P may indicate the probability score of the target account 310 based on respective weights or values applied to the payment data 360, pattern data 362, and/or peer data 364. The method score data 310M may be representative of contact data 352, device data 356, and/or location data 358. For example, method score data 310M may indicate the method score of the target account 310 based on respective weights or values applied to the contact data 352, device data 356, and/or location data 358. The time score data 310T may be representative of time data 354. The time score data 310T may indicate the time score of the target account 310 based on the time data 354.

The target account 318 may include the probability score data 318P, method score data 318M, and time score data 318T. It should be noted that the data 318P, 318M, and/or 318T may take the form of data packets to be referred to as data packets 318P, 318M, and/or 318T, respectfully. The probability score data 318P may indicate the probability score based on the payment data 372. The probability score data 318P may indicate the probability score for the target account 338 based on the payment data 372. The method score data 318M may be representative of contact data 366 and/or device data 370. The method score data 318M may indicate the method score of the target account 318 based on respective weights or values applied to the contact data 366 and/or device data 370. The time score data 318M may include or be representative of time data 368. The time score data 318T may indicate the time score of the target account 318 based on the time data 368.

The target account 338 may include probability score data 338P, method score data 338M, and time score data 338T. It should be noted that the data 338P, 338M, and/or 338T may take the form of data packets to be referred to as data packets 338P, 338M, and/or 338T, respectfully. Probability score data 338P may include or be representative of the recurring payment data 386, payment data 382, pattern data 384, and/or peer data 338. For example, probability score data 338P may indicate the probability score of the target account 338 based on respective weights or values applied to the recurring payment data 386, payment data 382, pattern data 384, and/or peer data 388. Method score data 338M may be representative of contact data 374, device data 378, and/or location data 380. For example, method score data 338M may indicate the method score of the target account 338 based on respective weights or values applied to the contact data 374, device data 378, and/or location data 380. Time score data 338T may be representative of time data 376. The time score data 338T may indicate the time score of the target account 338 based on the time data 376.

In some embodiments, the instructions, when executed by a server device (e.g., the network server devices 102 and/or 200) cause the server device to perform operations, such as the machine learning operations described herein. The operations performed by the server device may include determining or accessing a probability score for each of the target accounts 310, 318, and/or 338 based on a probability that the respective target account 310, 318, and/or 338 receives a payment.

In practice, the probability score of the target account 310 may be increased based on the weight or value applied to the pattern data 362, possibly where the weight or value exceeds that of the payment data 360 and/or peer data 364. For example, the pattern data 362 may indicate times associated with deposits submitted to the target account 310, possibly to pay off a negative balance of the target account 310. For instance, the times associated with the deposits submitted may be just after the first day of every month, possibly when the targeted user submits deposits to the target account 310 after receiving a payment amount from an employer. Thus, the pattern data 362 indicative of the pattern of deposits submitted may increase the probability score of the target account 310. In another example, the probability score of the target account 338 may be increased based on the weight or value applied to the recurring payment data 386, possibly where the weight or value exceeds that of the payment data 382, pattern data 384, and/or peer data 388. For example, recurring payment data 362 may indicate prior payment settings of a separate account that the target account 338 debits on a monthly basis to pay off a negative balance of the target account 338. In some instances, the prior payment settings may be turned off or inactive. Thus, the automated payment settings indicated by the recurring payment data 362 may increase the probability score of the target account 338 such that the targeted user may be contacted to turn on the prior payment settings or activatee the settings to continue with the monthly payments to pay off the negative balances.

Further, the operations may include determining or accessing a method score for each of the target accounts 310, 318, and/or 338 based on the determined method of contact for each of the target accounts 310, 318, and/or 338. In practice, the method score of the target account 310 may be increased based on the weight or value applied to the location data 358, possibly where the weight or value exceeds that of the contact data 352 and/or device data 356. For example, the location data 358 may provide an indication of the targeted user's availability, possibly where the targeted user may be located outdoors or in transit such that the targeted user may be contacted via the client device 302. Thus, the location data 358 indicative of the location of the client device 302 may increase the method score of the target account 310. In another example, the method score of the target account 318 may be modified based on the weight or value applied to the device data 370, possibly where the weight or value exceeds that of the contact data 366. For example, the device data 370 may indicate that the client device 304 is turned off, low in battery power, in sleep mode, in hibernation mode, possibly indicating that the method score related to contacting the targeted user via the client device 304 is lower than normal or other instances.

Further, the operations may include determining or accessing a time score for each of the target accounts 310, 318, and/or 338 based on the respective times determined to communicate with the respective devices 302, 304, and/or 308. For example, the time score of the target account 310 may be higher (e.g., 4 or 5 in the scale from 1 to 5) based on the time data 354 (e.g., the targeted user's schedule or calendar data) indicating that the targeted user is on lunch break from work. In another example, the time score of the target account 338 may be lower (e.g., 1 or 2 in the scale from 1 to 5) based on the time data 368 (e.g., the targeted user's schedule or calendar data) indicating that the targeted user is at the gym, possibly where the targeted user may be unavailable or away from their client device 308.

Thus, the operations may include initiating the communications to the respective devices 302, 304, and/or 308 based on the respective probability score, the method score, and the time score for each of the target accounts 310, 318, and/or 338. For example, the communication initiated to client device 302 for the target account 310 may be a phone communication such as an automated voice communication based on the location data 358 and/or the time data 354 described herein. Further, the communication initiated to the client device 304 for the target account 318 may be a text or SMS communication based on the device data 370 and/or the time data 368 described herein. In addition, the communication initiated for the target account 338 may be an email communication or notification regarding the automated payments to debit the target user's checking account or other account possibly also maintained by the server device, in accordance with the recurring payment data 362 described above. Thus, initiating the communications may include initiating an email communication, a text or SMS communication, and/or a phone communication to the respective devices 302, 304, and/or 308 at the respective times based on the probability scores, the method scores, and the time scores respective to the target accounts 310, 318, and/or 338, as described herein.

Figure 3E:
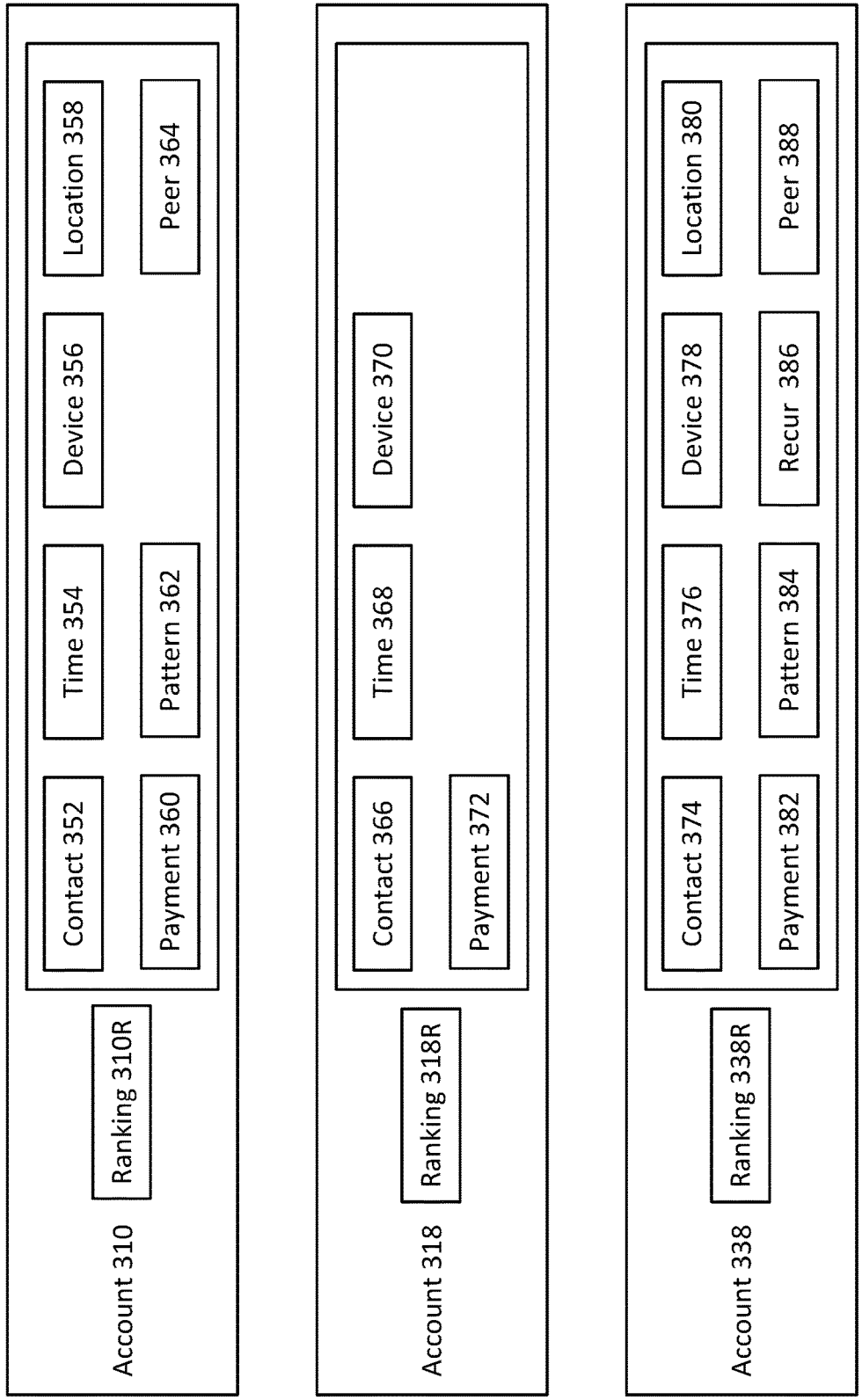
FIG. 3E illustrates data packets and a ranking of a number of target accounts, according to an embodiment.

FIG. 3E illustrates data packets 300E and ranking a number of the target accounts 310, 318 and/or 338, according to an embodiment. It should be noted that these target accounts 310, 318, and/or 338 may take the form of data packets to be referred to as data packets 310, 318, and/or 338, respectfully. In some embodiments, the instructions described above, when executed by a server device (e.g., the network server devices 102 and/or 200) may cause the server device to perform operations, such as the machine learning operations described herein. The operations may include ranking the number of target accounts 310, 318 and/or 338, based on the account profile for each account of the number of accounts 310, 318, and/or 338. For example, target account 310, possibly also referred to as the account profile 310, may indicate "slacker." The target account 318, possibly also referred to as the account profile 318, may indicate "unreliable" and/or "unpredictable." Yet further, the target account 338, possibly also referred to as the account profile 318, may indicate "troubled," and/or "fraudster." Thus, the target account 310 may be ranked higher than the target account 318, and further, the target account 318 may be ranked higher than the target account 338. As such, the server device may attempt to contact the target account 310 at a first time, then the target account 318 at a second time after the first time, and then the target account 338 at a third time after the second time. Thus, initiating the communications to the respective devices 302, 304, and/or 308 may be based at the ranking of the number of target accounts 310, 318, and/or 338, respectively.

In some embodiments, the ranking data 310R, 318R, and 338R may each indicate a value or score such that each of the corresponding target accounts 310, 318, and/or 338, respectively, may be ranked against each other. Thus, initiating the communications to the respective devices 302, 304, and/or 308 may be based at the ranking of the number of target accounts 310, 318, and/or 338, respectively. For example, the machine learning operations may include processing the account data 310, 318, and/or 338 to determine the ranking of each of the target accounts 310, 318, and 338. In particular, the ranking data 310R may indicate that the target account 310 is ranked first based on the server device processing the location data 358 and/or time data 354 indicative of the targeted user carrying the client device 302 from an office location to a food court location, possibly while the targeted user is on a lunch break. The ranking data 318R may indicate that the target account 318 is ranked second based on the device data 370 indicating that the client device 304 accepts a phone call, thereby designating a busy wireless signal received by the server device over the network. The ranking data 338R may indicate that the target account 338 is ranked third based on the server device processing the time data 376 and/or location data 380 indicating that the targeted user is at the gym.

Figure 4:
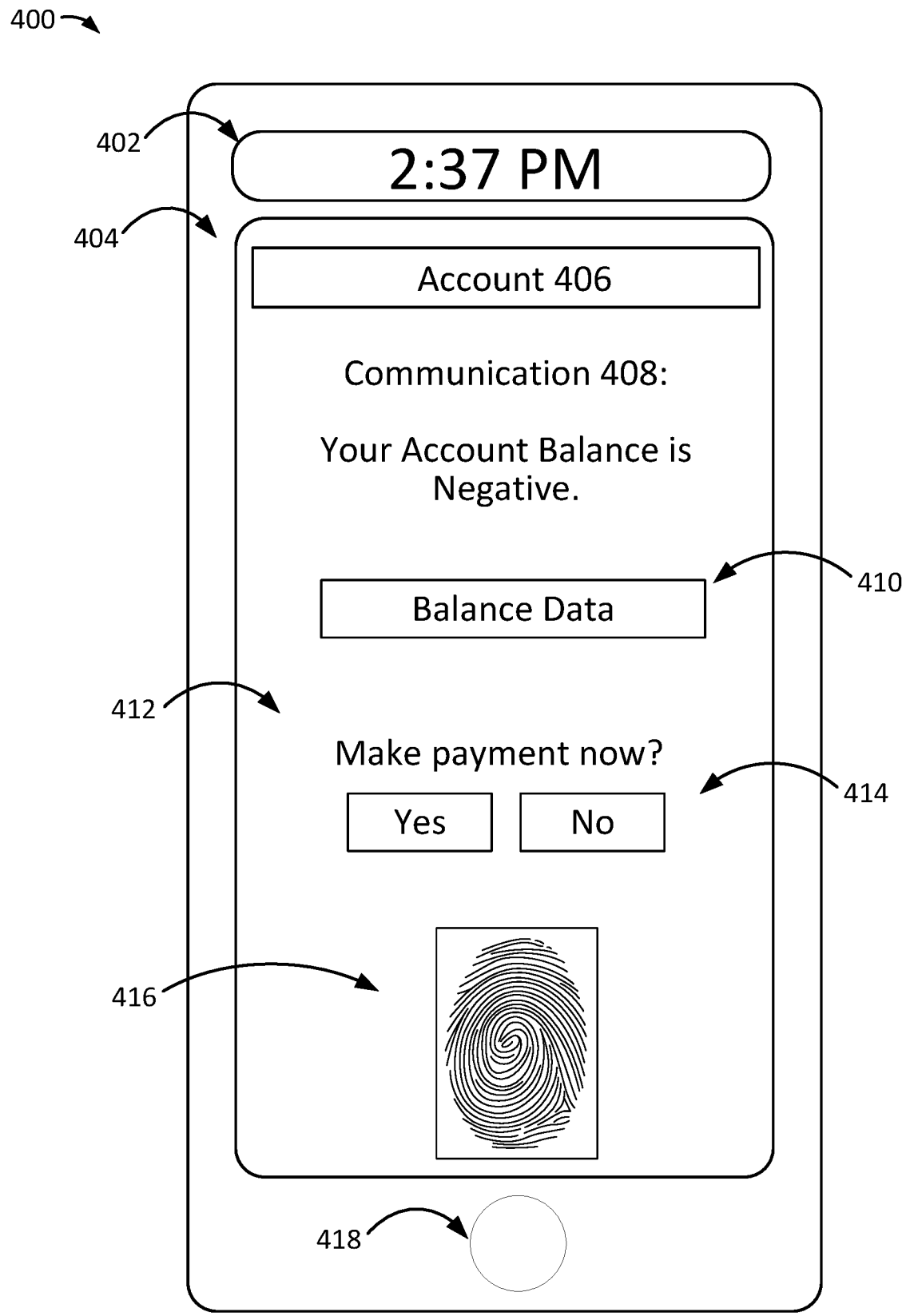
FIG. 4 illustrates an exemplary input/output (I/O) interface of a client device, according to an embodiment.

FIG. 4 illustrates an exemplary input/output (I/O) interface 404 of a client device 400, according to an embodiment. As shown, the client device 400 may take the form of one of the client devices 302, 304, 306, and/or 308 described above in relation to FIGS. 3A-3E. The I/O interface 404 may take the form of I/O interfaces 130 and/or 140 as described above. As shown, the client device 400 may display a time 402 via the I/O interface 404.

In some embodiments, a non-transitory computer-readable medium may have stored thereon instructions that, when executed by the client device 400, cause the client device 400 to perform operations. In some instances, the operations may include displaying, by the I/O interface 404 of the client device 400, account or account data 406 that may include profile data indicative of the account profile accessible by the client device 400. The operations may also include displaying, by the I/O interface 404, communication data 408 possibly received from a server device described herein. As shown, communication data 408 may include text indicating, "Your Account Balance is Negative." For example, communication data 408 that may take the form of email communication data, a text or SMS communication data, and/or a telephonic communication data, possibly displaying words through voice-recognition processing.

Further, the operations may also include displaying a balance data input 410 where upon selection (e.g., a touch selection input) of the balance data input 410, the one or more respective balances of the account 406 may be displayed by the I/O interface 404. Yet further, communication data 408 may include an option 412 to make a payment. Based on selecting the yes or no inputs 414, the client device 400 may be operated to make a payment to the one or more respective balances of the account 406. In some instances, the client device 400 may receive authentication or sensor data 416 via sensor 418 to make the payment to the one or more respective balances of the account 406. In some instances, the yes input 414 and the authentication or sensor data 416 may be entered simultaneously by a touch-selection of the yes input 414 and a fingerprint scan via the sensor 418.

In some instances, making the payment may require such simultaneous actions to ensure proper authenticity in making the payment.

Figure 5:
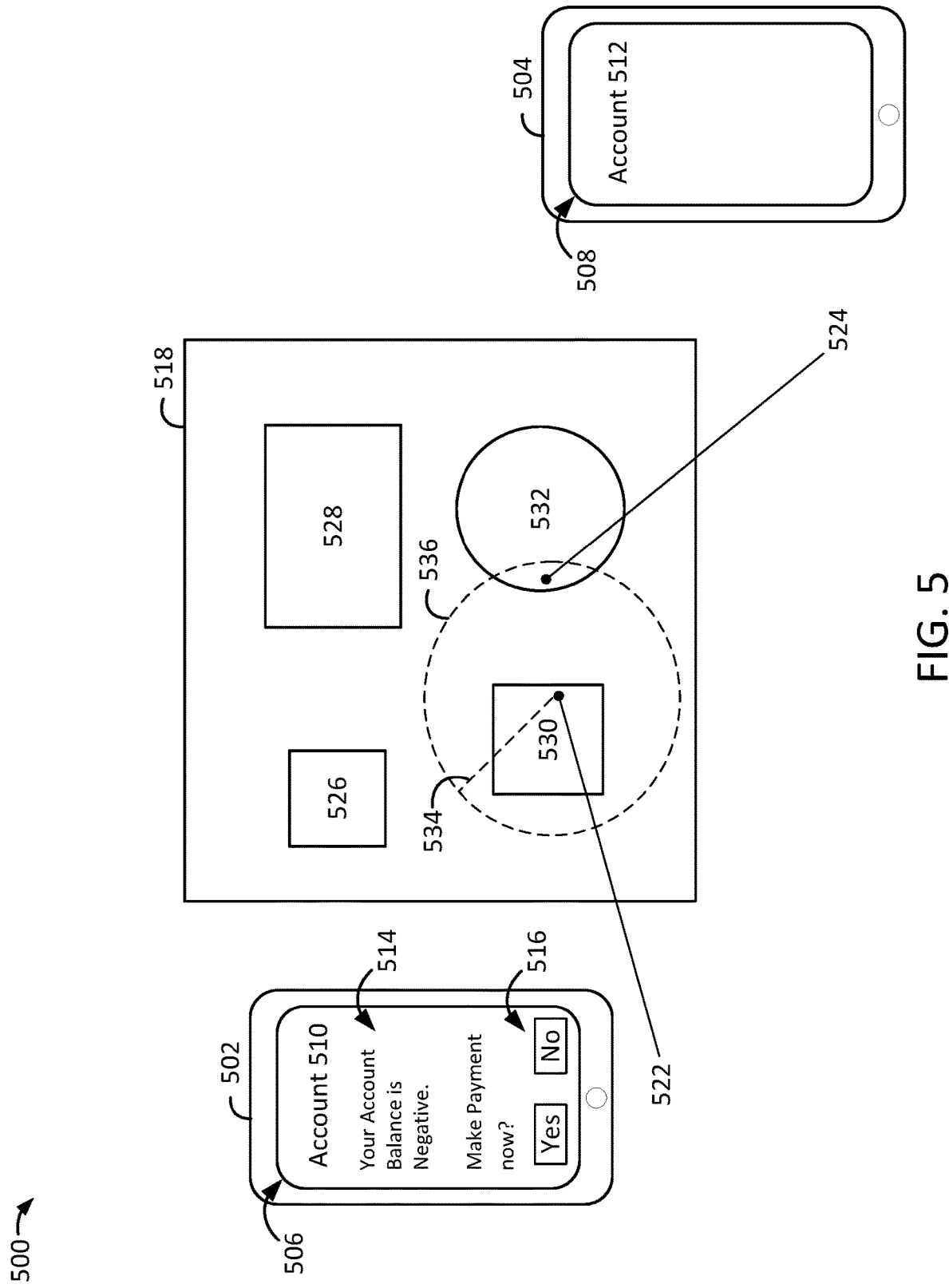
FIG. 5 is an exemplary system, according to an embodiment.

FIG. 5 is an exemplary system 500, according to an embodiment. In some instances, a server device such as those described above may perform machine learning operations to process data accordingly and/or send communications to client devices. FIG. 5 is an example of the server device processing behavioral data including location data described above and/or co-location data. In particular, the server device may determine times to communicate with a client device based on predicting when the targeted user will attempt to make a payment under their targeted account. As such, the server device may perform machine learning operations, thereby initiating communications to client devices associated with target accounts accordingly. As shown, the client devices 502 and/or 504 may take the form of any of the client devices 302, 304, 306, 308, and/or 400 described above, among other client devices in relation to FIGS. 1-4. Further, the input/output (I/O) interfaces 506 and/or 508 may take the form of any of the I/O interfaces 130, 140, and/or 404.

As illustrated, the account 510 accessed by the client device 502 may be a target account. For example, the target account 510 may be determined by the server device based on identifying that the balance of the target account 510 is low, zero, or negative. In some instances, the server device may determine a time to communicate with client device 502 based on behavioral data indicating a threshold radius 534 around the location 522 of the client device 502 and/or an area 536 of the client device 502 derived from the threshold radius 534. For example, consider a scenario where the client device 502 enters the merchant store 530, possibly proximate to the other stores 526, 528, and/or 532 shown on the map 518 for illustrative purposes. In particular, the movement of the client device 502 may cause the merchant store 530 to be within the area 536 of the client device 502. As such, the server device may process the behavioral data including location data indicative of the client device 502, the threshold radius 534, the area 536, and/or the merchant store 530 to determine the targeted user is likely to attempt a transaction at the merchant store 530. In such instances, the server device may initiate a communication 514 to the client device 502 to urge the targeted user to pay a negative balance in the target account 510 before attempting to make a transaction at the merchant store 530, possibly where the attempted transaction may be declined. As shown, the communication 514 may include text indicating, "Your Account Balance is Negative." Further, the server device may enable the targeted user to consider making a payment using the yes or no inputs 516 in the I/O interface 506.

In another example, consider a scenario where the client device 502 approaches the client device 504 shown in the merchant store 532 at the location 524. As shown, the account 512 accessed by the client device 504 may be a merchant account and/or a seller account, possibly also a peer account to the target account 510. Further, consider that the target account 510 has a purchase history with the merchant store 532 and/or the merchant account 512. Thus, the server device may retrieve and process behavioral data including purchase history data and/or the location data indicative of the client device 502, the threshold radius 534, the derived area 536, the merchant store 532, and/or the location 524 of the merchant device 504. In such instances, the server device may initiate the communication 514 to the client device 502 to capture the targeted user's attention to pay off the negative balance or pay to increase the balance in the target account 510 before attempting to make a transaction with the merchant device 504, possibly where the attempted transaction may be declined. Further, the server device may enable the targeted user to consider making a payment using the yes or no inputs 516 via the I/O interface 506. As demonstrated by the scenarios above, the targeted users may be contacted efficiently and also prevented from attempting to make transactions with deficient balances. In particular, the targeted users may be contained or prevented from further activities, in addition to activating or creating new accounts and performing activities under the newly created accounts, as described above.

In addition, the server device may retrieve peer data including social media data that indicates a link or a connection between the target account 510 and the merchant account 512, possibly in a social media network, a buyer-seller network, and/or a user-merchant network. In such instances, the server device may delay the communication 514 until the movement of the target device 502 causes the merchant device 504 to be within the derived area 536. Thus, the communication 514 may capture the targeted user's attention before attempting to make at transaction with the merchant device 504. In some embodiments, the server device may retrieve behavioral data that includes peer data and/or social media data that indicates methods to contact peer accounts associated with the target account 510. For example, considering the scenario where the target account 510 and the merchant account 512 are in the same social network, the one or more data processing components of the server device may determine the method of contact (e.g., social media messaging) for the target account 510 based on the determined method to contact the peer account 512.

Figure 6:
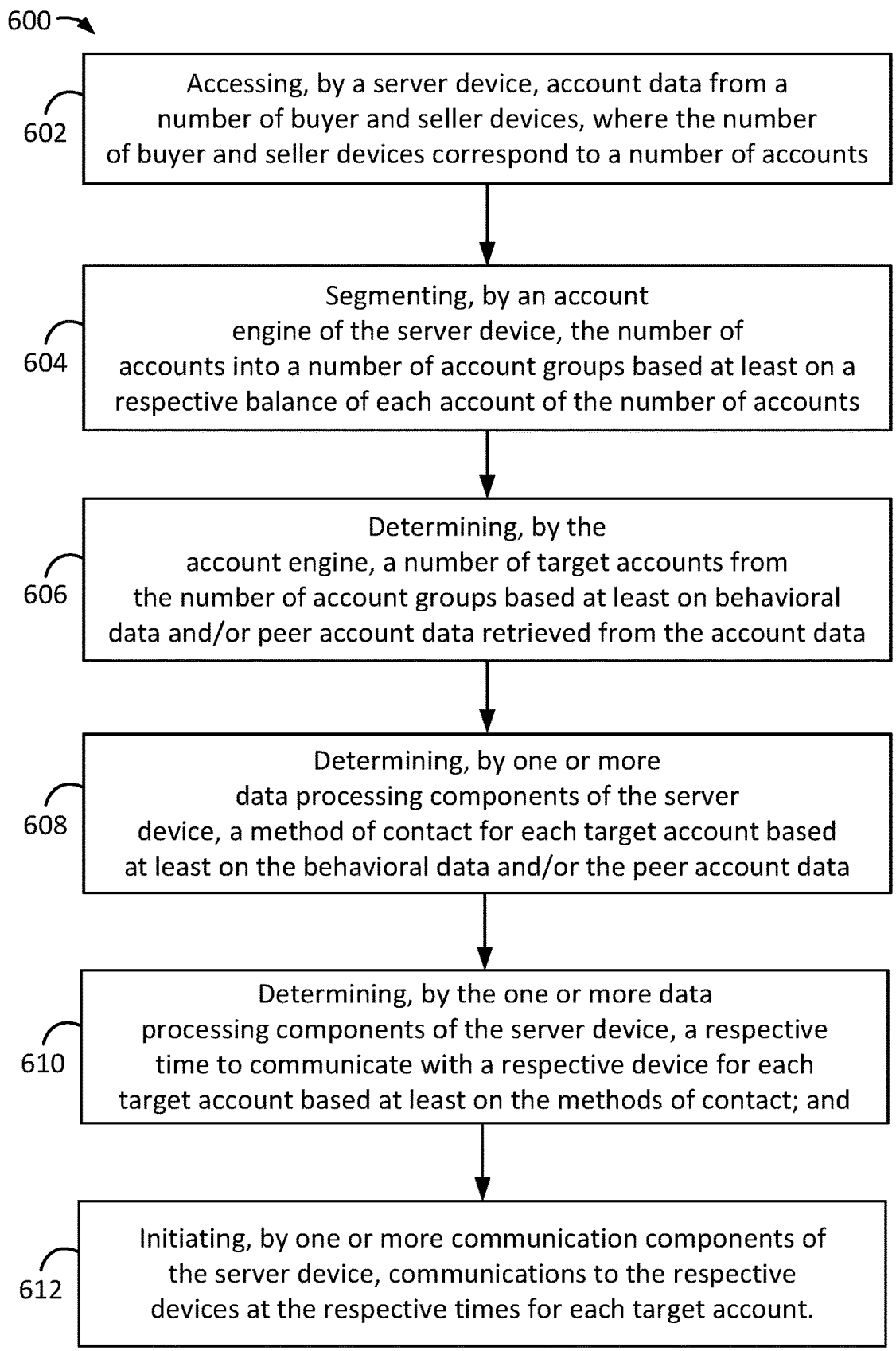
FIG. 6 is a flowchart of an exemplary method, according to an embodiment.

FIG. 6 is a flowchart of an exemplary method 600, according to an embodiment. Notably, one or more steps of the method 600 or other methods/processes described herein may be omitted, performed in a different sequence, and/or combined with other methods, such as the method 390 described above, for various types of applications.

At step 602, the method 600 may include accessing, by a server device, account data from a number of buyer and seller devices, where the number of buyer and seller devices correspond to a number of accounts. For example, referring back to FIGS. 1-5, the method 600 may include accessing, by the server device (e.g., the server devices 102 and/or 200), the account data or data packets 300 from a number of buyer and seller devices 302, 304, 306, and/or 308, where the number of the buyer and seller devices 302, 304, 306, and/or 308 correspond to a number of accounts 310, 314, 318, 322, 326, 330, 334, and/or 338.

At step 604, the method 600 may include segmenting, by an account engine of the server device, the number of accounts into a number of account groups based at least on a respective balance of each account of the number of accounts. For example, referring back to FIGS. 1-3A, the method 600 may include segmenting, by an account engine (e.g., the account engines 112 and/or 232) of the server device described above, the number of accounts 310, 314, 318, 322, 326, 330, 334, and/or 338, into a number of account groups 342, 344, and/or 346 based on a respective balance of each account of the number of accounts 310, 314, 318, 322, 326, 330, 334, and/or 338. For example, the accounts 314, 326, and/or 330 in account group 342 may have low or zero balances. The accounts 318 and/or 334 in the account group 344 may have moderately negative balances. Further, the account 310, 322, and/or 338 in the account group 346 may have substantially negative balances, for instance.

At step 606, the method 600 may include determining, by the account engine, a number of target accounts from the number of account groups based at least on behavioral data and/or peer account data retrieved from the account data. For example, referring back to FIGS. 1-3A, the method 600 may include determining, by the account engine described above, a number of target accounts 310, 318, and/or 338 from the number of account groups 344 and/or 346 based on behavioral data 312, 320, and/or 340 and/or peer account data 314, 322, 326, 330, and/or 334 retrieved from the account data or data packets 300. As such, the target accounts 310, 318, and/or 338 may be determined or selected based on comparing peer accounts including accounts 334 and/or 322 also shown in FIG. 3A as being included in the account groups 344 and/or 346. In particular, the accounts 334 and/or 322 may not be selected as target accounts based on a machine learning process determining that the probability of the balances in accounts 334 and/or 322 being paid off is lower that the probabilities of the target accounts 310, 318, and/or 338 being paid off.

At step 608, the method 600 may include determining, by one or more data processing components of the server device, a method of contact for each target account based at least on the behavioral data and/or the peer account data. For example, referring back to FIGS. 1-3B, the method 600 may include determining, by one or more data processing components of the server device, a method of contact from contact data 352, 366, and/or 372 for each target account 310, 318, and/or 338, respectfully, based on the behavioral data 312, 320, and/or 340, and/or the peer account data 314, 322, 326, 330, and/or 334. For example, the one or more data processing components may compile the contact data 352, 366, and/or 374 from the peer account data 314, 322, 326, 330, and/or 334 that includes phone number data, email address data, mailing address data, fax number data, and/or application programming interface (API) data, and/or other forms of data related to contacting the client device 302, 304, and/or 308.

At step 610, the method 600 may include determining, by the one or more data processing components, a respective time to communicate with a respective device for each target account based at least on the methods of contact. For example, the method 600 may include determining, by the one or more data processing components, respective times to communicate with respective devices 302, 304, and/or 308 for each target account 310, 318, and/or 338 based at least on the methods of contact determined from contact data 352, 366, and/or 372, respectfully.

At step 612, the method 600 may include initiating, by one or more communication components of the server device, communications to the respective devices at the respective times for each target account. For example, the method 600 may include initiating, by one or more communication components (e.g., communication component 118 and/or 238) of the server device described above, communications to the respective devices 302, 304, and/or 308 at the respective times determined from time data 354, 368, and/or 376 for each target account 310, 318, and/or 338, respectively.

In some embodiments, the location data 358 and/or 380 includes sensor data received from the number of buyer and seller devices 302, 304, 306, and/or 308. For example, referring back to FIG. 5, the client device 502 may include one or more sensors (e.g., proximity sensors, radios, and/or communication components) capable of exchanging sensor data including radio-frequency identifier (RFID) data, near-field communications (NFC) data, geo location data, WiFi beaconing data, SSID reading data, Bluetooth data, and/or other near-field communication data. The sensor data may enable the server device to determine one or more locations of the client device 502. As such, the method 600 may include retrieving the sensor data that indicates the locations of the respective devices 302, 304, and/or 308 determined from the number of buyer and seller devices 302, 304, 306, and/or 308.

In some embodiment, the method 600 may include ranking the number of target accounts 310, 318, and/or 338 based on the respective balance of each account. For example, the target account with the most negative balance may be ranked the highest such that a client device associated with the target account is one of the initial devices contacted. Further, initiating the communications to the respective devices 302, 304, and/or 308 may be based on the ranking of the number of target accounts 310, 318, and/or 338.

Figure 7A:
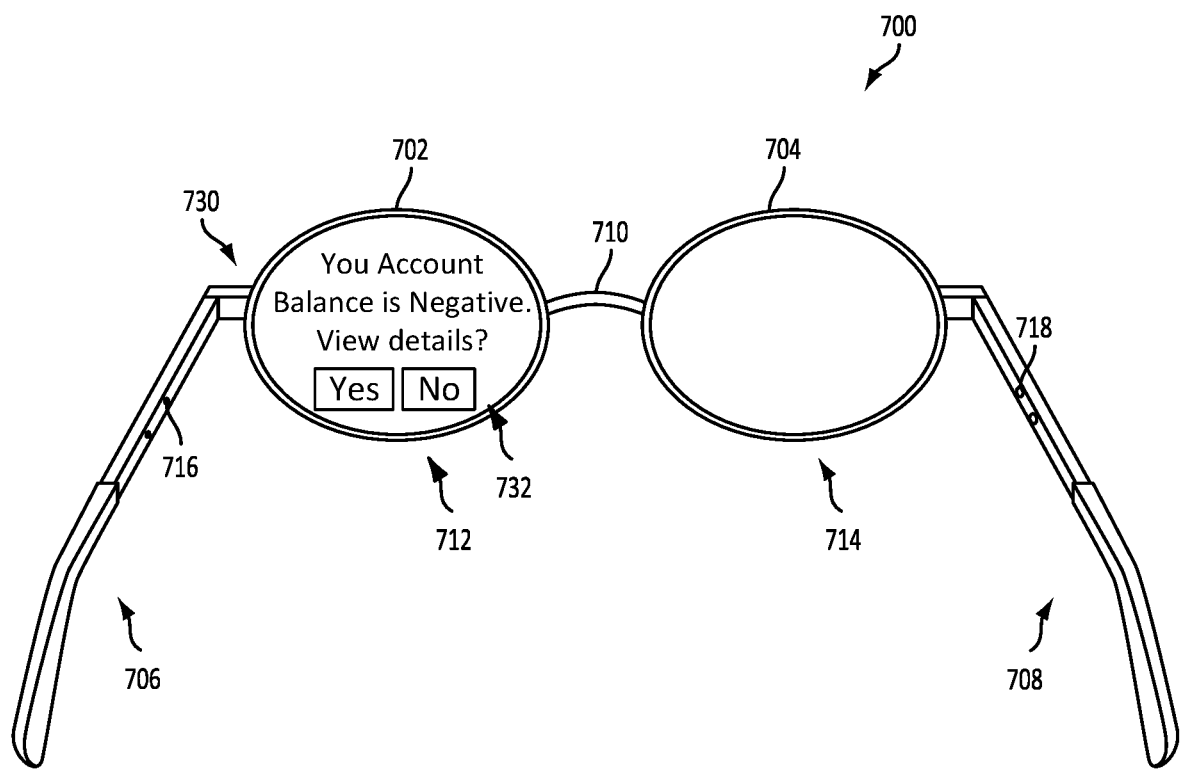
FIGS. 7A and 7B illustrate an exemplary wearable computing device, according to an embodiment.
Figure 7B:
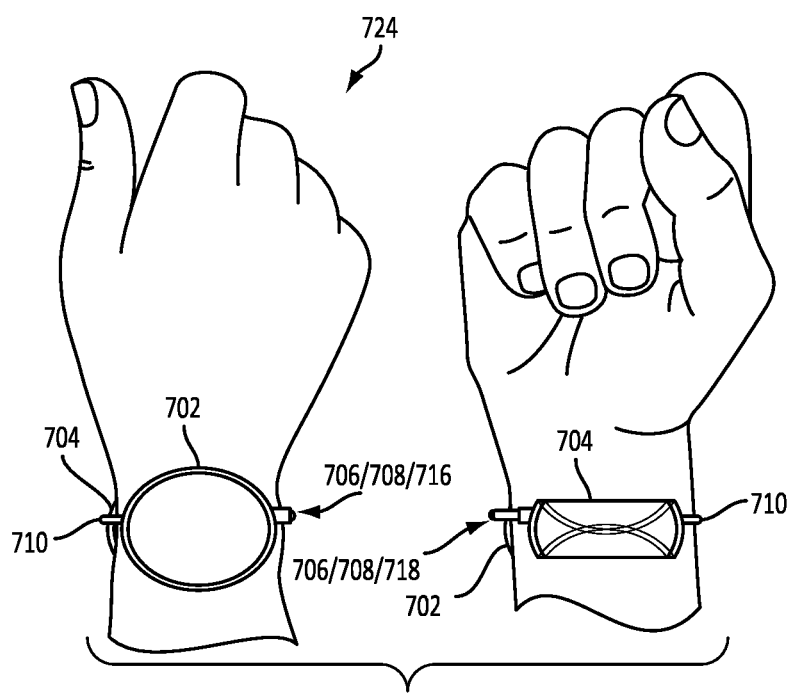

FIGS. 7A and 7B illustrate an exemplary wearable computing device 700, according to an embodiment. As illustrated, the wearable computing device 700 may take the form of a head-mountable display (HMD) and/or an arm or wrist-mountable display. As shown in FIG. 7A, the wearable computing device 700 may be wearable as a HMD device. The device 700 may include lenses 702 and 704. The device 700 may also include a side component 706, a side component 708, and a middle component 710. For example, the device 700 may be mountable on a user's head such that the side component 706 rests on one ear of the user and the side component 708 rests on the other ear of the user. Further, the middle component 710 may rest on the nose of the user. In some instances, the lenses 702 and 704 may be positioned in front of the user's eyes. Further, the lenses 702 and 704 may include displays 712 and 714, respectively. In some instances, the displays 712 and 714 may be transparent, partially see-through, and/or configured to provide an augmented reality. Further, the displays 712 and/or 714 may include touch pad displays to display data and receive touch inputs such that the user can manipulate graphics provided by the displays 712 and/or 714. The lenses 702 and/or 704 may also include scanners such as laser scanners configured to scan the eyes of the user to retrieve biometric inputs based on the user's eyes, retinas, and/or irises, possibly for authenticating the user's account.

As shown, the display 712 may provide a communication 730, possibly similar to those described above in relation to FIGS. 3A-6. As such, a communication may be displayed, "Your Account Balance is Negative. View details?" Further, user data 732 may provide selections, "Yes" and "No." Thus, by selecting "Yes," possibly through verbal command or a touch selection input, the account balance may be viewed via display 712. Further, by selecting "No," possibly through a verbal command or a touch selection input, the communication 730 may be cleared from the display 712.

As shown in FIG. 7B, the wearable computing device 700 may also be wearable as an arm/wrist-mountable device. Yet, the wearable computing device 700 may take the form of a bracelet, an anklet, and/or a necklace, among other forms of accessories. As shown, the side components 706 and 708, the middle component 710, and/or the lenses 702 and 704 may be adjustable to fit on an arm and/or wrist 724 of a user. As shown, the lens 702 may be positioned on the top of the wrist 724 to operate as the face of a wrist watch. The side components 706, 708, and/or the middle component 710 may be adjusted to fit around the wrist 724. The lens 704 may be positioned on the bottom of the wrist 724. As shown, the lens 704 may be flexible, foldable, and/or retractable, among other ways to adjust into the form of a wrist-watch band.

The wearable computing device 700 may include one or more sensors 716 and/or 718 configured to receive a number of inputs associated with the user. The one or more sensors 716 and/or 718 may also include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 700 is worn as a head-mountable device or an arm/wrist-mountable device, the sensors 716 and/or 718 may be configured to receive inputs directly and/or indirectly from the user. In some embodiments, the lens 702 may include a sensor that may, for example, include a capacitive sensor and/or proximity sensor to sense, detect, and/or identify the user of the device 700. Further, the sensor may include a biometric sensor such as a fingerprint sensor. Thus, the fingerprint sensor may receive one or more fingerprint inputs from user, possibly to view an account balance.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
   a processor;
   a network interface device; and
   a non-transitory computer-readable medium having stored thereon instructions executable by the processor to cause the system to perform operations comprising:
   accessing, through the network interface device via an Internet communication protocol, account data from a plurality of user devices corresponding to a plurality of accounts, the account data including behavioral data associated with each of the plurality of accounts;
   determining, by an account engine provided by a server device of the system, one or more target accounts from the plurality of accounts based at least on a respective number of account activities indicated by the behavioral data;
   determining, by a data processing component provided by the server device, target scores for each of the one or more target accounts based on the behavioral data associated with respective ones of the one or more target accounts, wherein the target scores are indicative of a probability of an account-related action by a respective user of a respective user device associated with each of the one or more target accounts;
   initiating, by a communication component provided by the server device, a communication to the respective user device associated with a particular target account of the one or more target accounts based on the behavioral data associated with the particular target account; and
   after initiating the communication, receiving, through the network interface via the Internet communication protocol, an authorization for an account-specific action for the particular target account from the respective user device associated with the particular target account to change a status of the particular target account.

2. The system of claim 1, wherein the operations further comprise:
based on the respective user selecting a link in the communication to the respective user device, initiating an authentication procedure for the particular target account;
receiving an authentication response to the authentication procedure; and
performing the authorization for the account-specific action for the particular target account based on the authentication response to the authentication procedure.

3. The system of claim 1, wherein the account-specific action to change the status of the particular target account includes at least partially paying off an account balance of the particular target account.

4. The system of claim 1, wherein the account-specific action to change the status of the particular target account includes adding a new funding source for the particular target account, and wherein the new funding source is authorized by the respective user of the respective user device associated with the particular target account to be accessible by the system in order to at least partially pay off an account balance of the particular target account.

5. The system of claim 1, wherein the determining the one or more target accounts is based on respective balances of one or more accounts of the plurality of accounts.

6. The system of claim 1, wherein the operations further comprise:
based on the behavioral data associated with the particular target account, determining a particular method of contact for the communication having a higher probability of the account-related action by the respective user of the respective user device associated with the particular target account than another method of contact.

7. The system of claim 1, wherein the particular target account of the one or more target accounts is identified based on ranking data determined from the target scores for each of the one or more target accounts.

8. The system of claim 1, wherein the operations further comprise:
determining a particular time for the communication based on timing data associated with the particular target account of the one or more target accounts.

9. A method, comprising:
accessing, by a server device via an Internet communication protocol, account data from a plurality of user devices corresponding to a plurality of accounts, the account data including behavioral data associated with each of the plurality of accounts;
determining, by an account engine of the server device, one or more target accounts from the plurality of accounts based at least on a respective number of account activities indicated by the behavioral data;
determining, by a data processing component of the server device, target scores for each of the one or more target accounts based on the behavioral data associated with respective ones of the one or more target accounts, wherein the target scores are indicative of a determined probability of an account-related action by a respective user of a respective user device associated with each of the one or more target accounts, and wherein a particular target account of the one or more target accounts is identified based on the target scores for each of the one or more target accounts;
initiating, by a communication component of the server device, a communication to the respective user device associated with the particular target account based on the behavioral data associated with the particular target account; and
after initiating the communication, receiving, by the server device via the Internet communication protocol, an authorization for an account-specific action for the particular target account from the respective user device associated with the particular target account to change a status of the particular target account.

10. The method of claim 9, further comprising:
based on the respective user selecting a link in the communication to the respective user device, initiating an authentication procedure for the particular target account;
receiving an authentication response to the authentication procedure; and
performing the authorization for the account-specific action for the particular target account based on the authentication response to the authentication procedure.

11. The method of claim 9, wherein the account-specific action to change the status of the particular target account includes at least partially paying off an account balance of the particular target account.

12. The method of claim 9, wherein the account-specific action to change the status of the particular target account includes adding a new funding source for the particular target account, and wherein the new funding source is authorized by the respective user of the respective user device associated with the particular target account to be accessible by the server device in order to at least partially pay off an account balance of the particular target account.

13. The method of claim 9, wherein the determining the one or more target accounts is based on respective balances of one or more accounts of the plurality of accounts.

14. The method of claim 9, further comprising:
based on the behavioral data associated with the particular target account, determining a particular method of contact for the communication having a higher determined probability of the account-related action by the respective user of the respective user device associated with the particular target account than another method of contact.

15. The method of claim 9, wherein the particular target account of the one or more target accounts is identified based on ranking data determined from the target scores for each of the one or more target accounts.

16. A non-transitory computer-readable medium having stored thereon instructions executable by a system to cause the system to perform operations comprising:
accessing account data from a plurality of user devices corresponding to a plurality of accounts, the account data including behavioral data associated with each of the plurality of accounts, and the account data including data received via an Internet communication protocol;
determining, by an account engine provided by a server device of the system, one or more target accounts from the plurality of accounts based at least on a respective number of account activities indicated by the behavioral data;

determining, by a data processing component provided by the server device, target scores for each of the one or more target accounts based on the behavioral data associated with respective ones of the one or more target accounts, wherein the target scores are indicative of a determined probability of an account-related action by a respective user of a respective user device associated with each of the one or more target accounts;

initiating, by a communication component provided by the server device, a communication to the respective user device associated with a particular target account of the one or more target accounts based on the behavioral data associated with the particular target account; and after initiating the communication, receiving, through the data received via the Internet communication protocol, an authorization for an account-specific action for the particular target account from the respective user device associated with the particular target account to change a status of the particular target account.

17. The non-transitory computer-readable medium of claim 16, wherein the operations further comprise:
determining a particular time for the communication based on timing data associated with the plurality of accounts.

18. The non-transitory computer-readable medium of claim 16, wherein the operations further comprise:
based on the respective user selecting a link in the communication to the respective user device, initiating an authentication procedure for the particular target account;
receiving an authentication response to the authentication procedure; and
performing the authorization for the account-specific action for the particular target account based on the authentication response to the authentication procedure.

19. The non-transitory computer-readable medium of claim 16, wherein the operations further comprise:
based on the behavioral data associated with the particular target account, determining a particular method of contact for the communication having a higher determined probability of the account-related action by the respective user of the respective user device associated with the particular target account than another method of contact.

20. The non-transitory computer-readable medium of claim 16, wherein the particular target account of the one or more target accounts is identified based on ranking data determined from the target scores of the one or more target accounts.

* * * * *